United States Patent [19]

Chang

[11] Patent Number: 5,348,715
[45] Date of Patent: Sep. 20, 1994

[54] PROCESSES TO REMOVE ACID FORMING GASES FROM EXHAUST GASES

[75] Inventor: Shih-Ger Chang, El Cerrito, Calif.

[73] Assignee: The Regents of the University of California, Oakland, Calif.

[21] Appl. No.: 853,904

[22] Filed: Mar. 19, 1992

Related U.S. Application Data

[63] Continuation-in-part of Ser. No. 819,758, Jan. 13, 1992, which is a continuation-in-part of Ser. No. 518,722, May 4, 1990, Pat. No. 5,106,601, which is a continuation-in-part of Ser. No. 261,229, Oct. 24, 1988, Pat. No. 5,164,167.

[51] Int. Cl.$^5$ ............................................. C01B 21/00
[52] U.S. Cl. ................................. 423/235; 423/243.1
[58] Field of Search .................. 423/235, 235 D, 239, 423/239 A, 239 Y, 243.1

[56] References Cited

U.S. PATENT DOCUMENTS

| | | | |
|---|---|---|---|
| 3,984,522 | 10/1976 | Saito et al. | 423/235 |
| 4,029,739 | 6/1977 | Senjo et al. | 423/235 |
| 4,055,624 | 10/1977 | Yoshida et al. | 423/235 |
| 4,061,743 | 12/1977 | Senjo et al. | 423/235 |

Primary Examiner—Michael Lewis
Assistant Examiner—Thomas G. Dunn, Jr.
Attorney, Agent, or Firm—Phillips Moore Lempio & Finley

[57] ABSTRACT

The present invention relates to a process for reducing the concentration of NO in a gas, which process comprises:

(A) contacting a gas sample containing NO with a gaseous oxidizing agent to oxidize the NO to $NO_2$;

(B) contacting the gas sample of step (A) comprising $NO_2$ with an aqueous reagent of bisulfite/sulfite and a compound selected from urea, sulfamic acid, hydrazinium ion, hydrazoic acid, nitroaniline, sulfanilamide, sulfanilic acid, mercaptopropanoic acid, mercaptosuccinic acid, cysteine or combinations thereof at between about 0° and 100° C. at a pH of between about 1 and 7 for between about 0.01 and 60 sec; and (C) optionally contacting the reaction product of step (A) with conventional chemical reagents to reduce the concentrations of the organic products of the reaction in step (B) to environ-mentally acceptable levels. Urea or sulfamic acid are preferred, especially sulfamic acid, and step (C) is not necessary or performed.

29 Claims, 16 Drawing Sheets

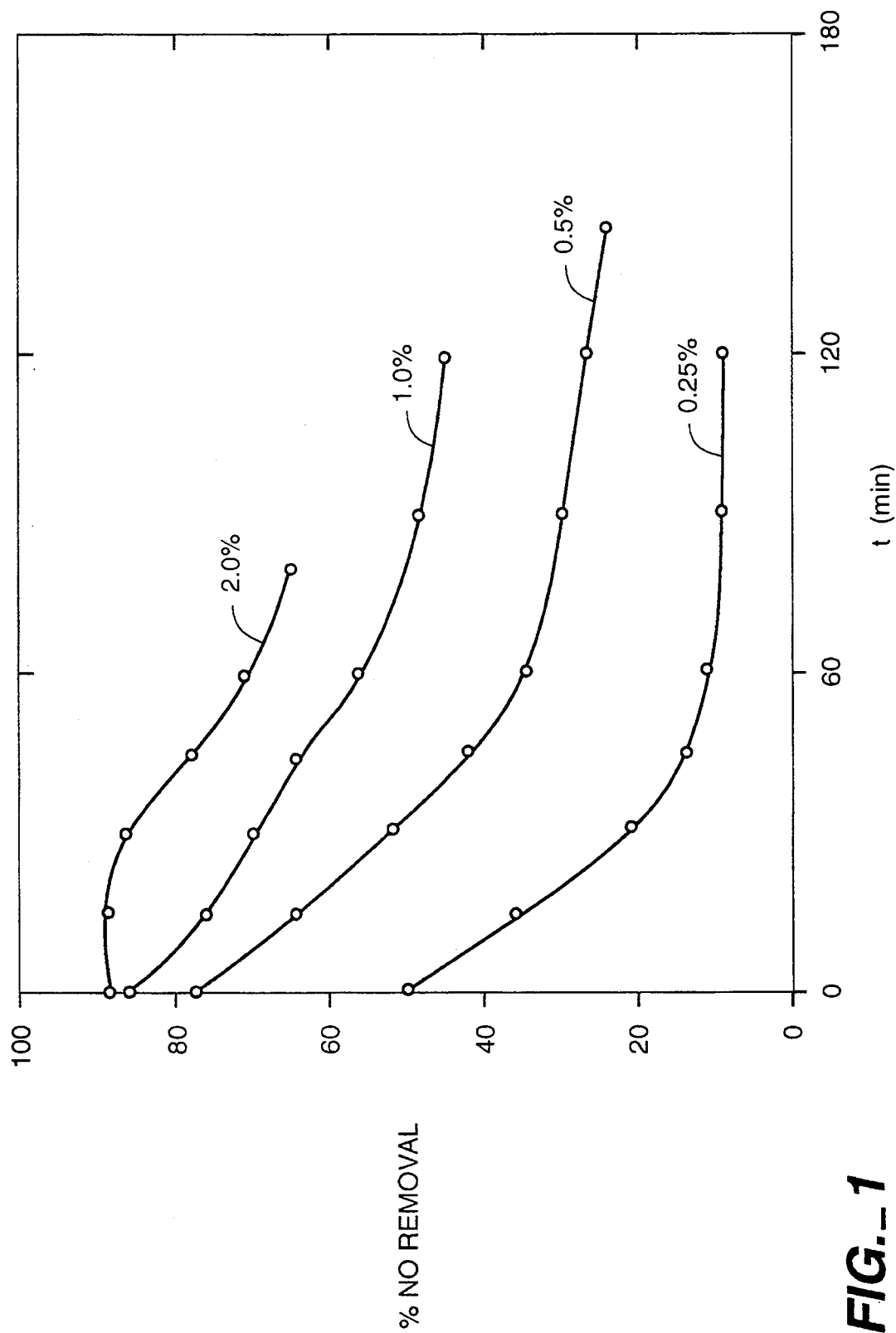
FIG._1

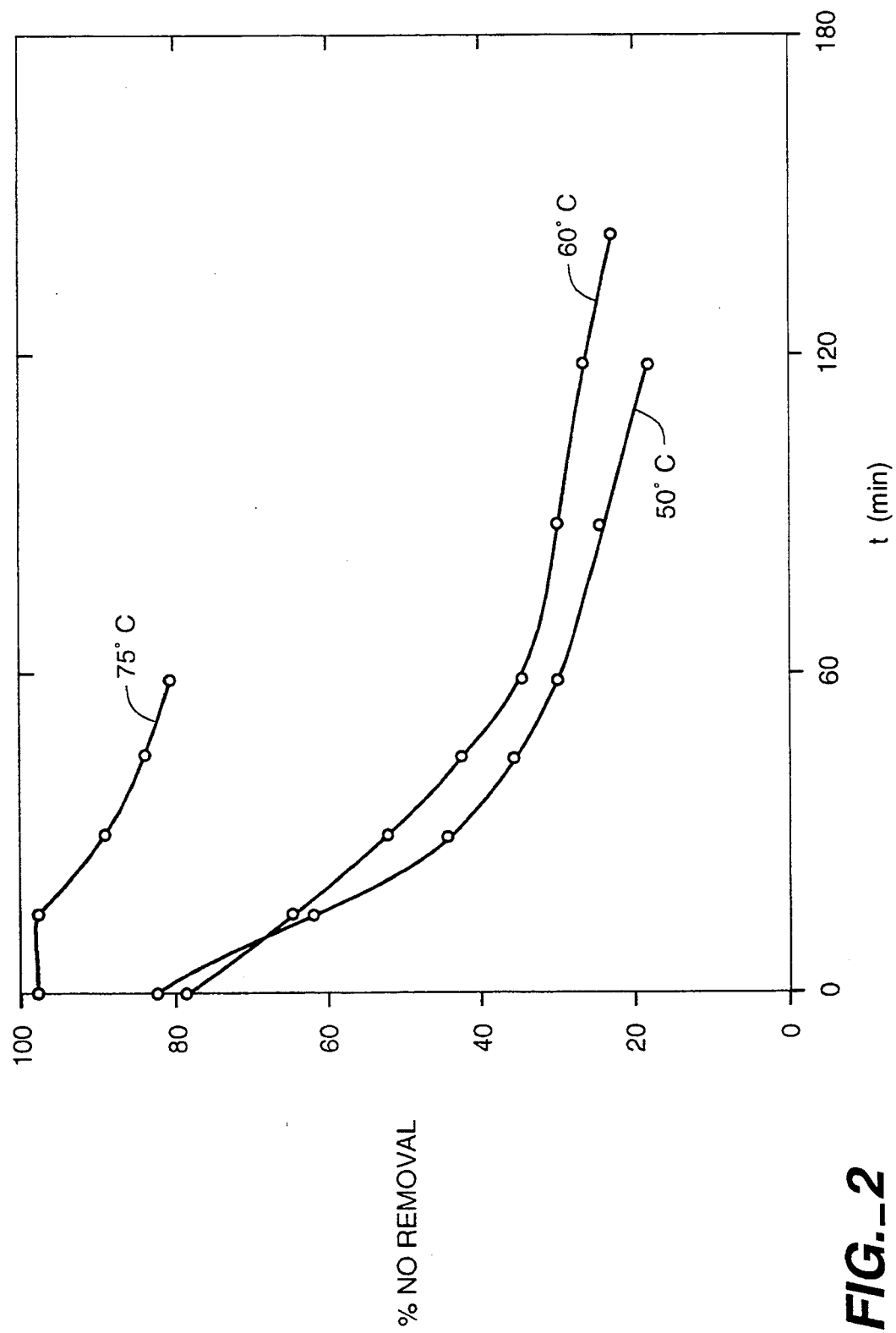
FIG._2

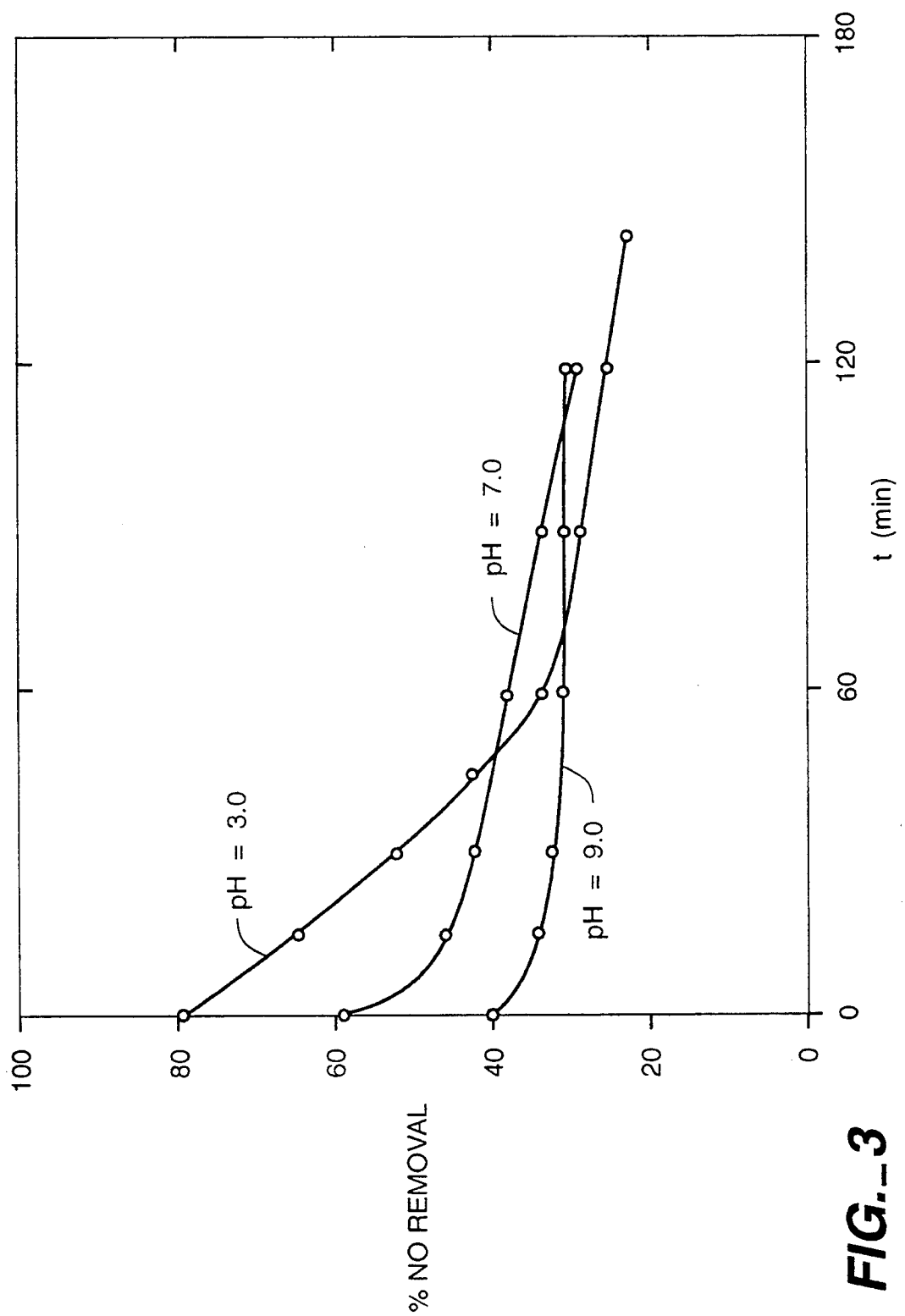
FIG._3

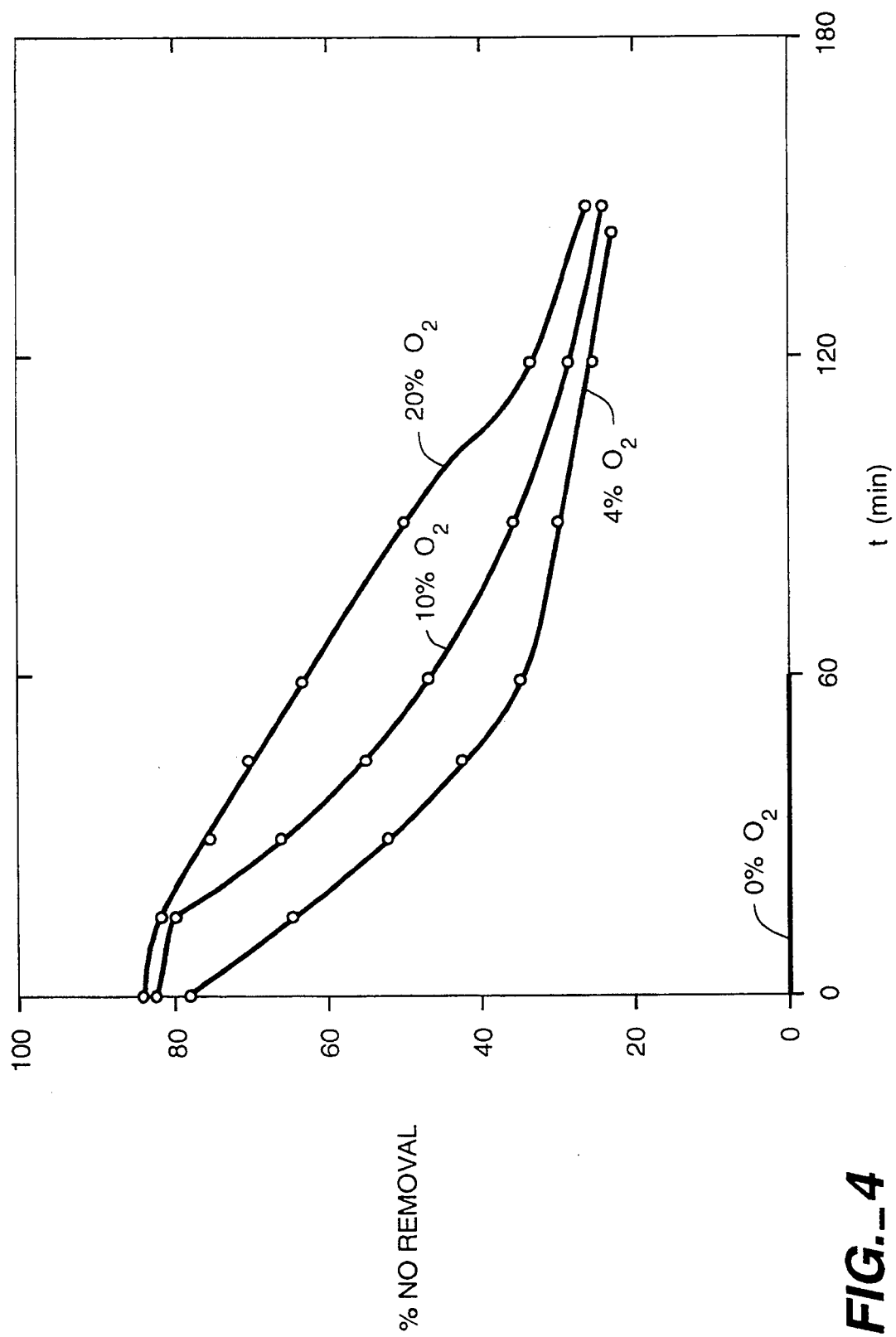
FIG._4

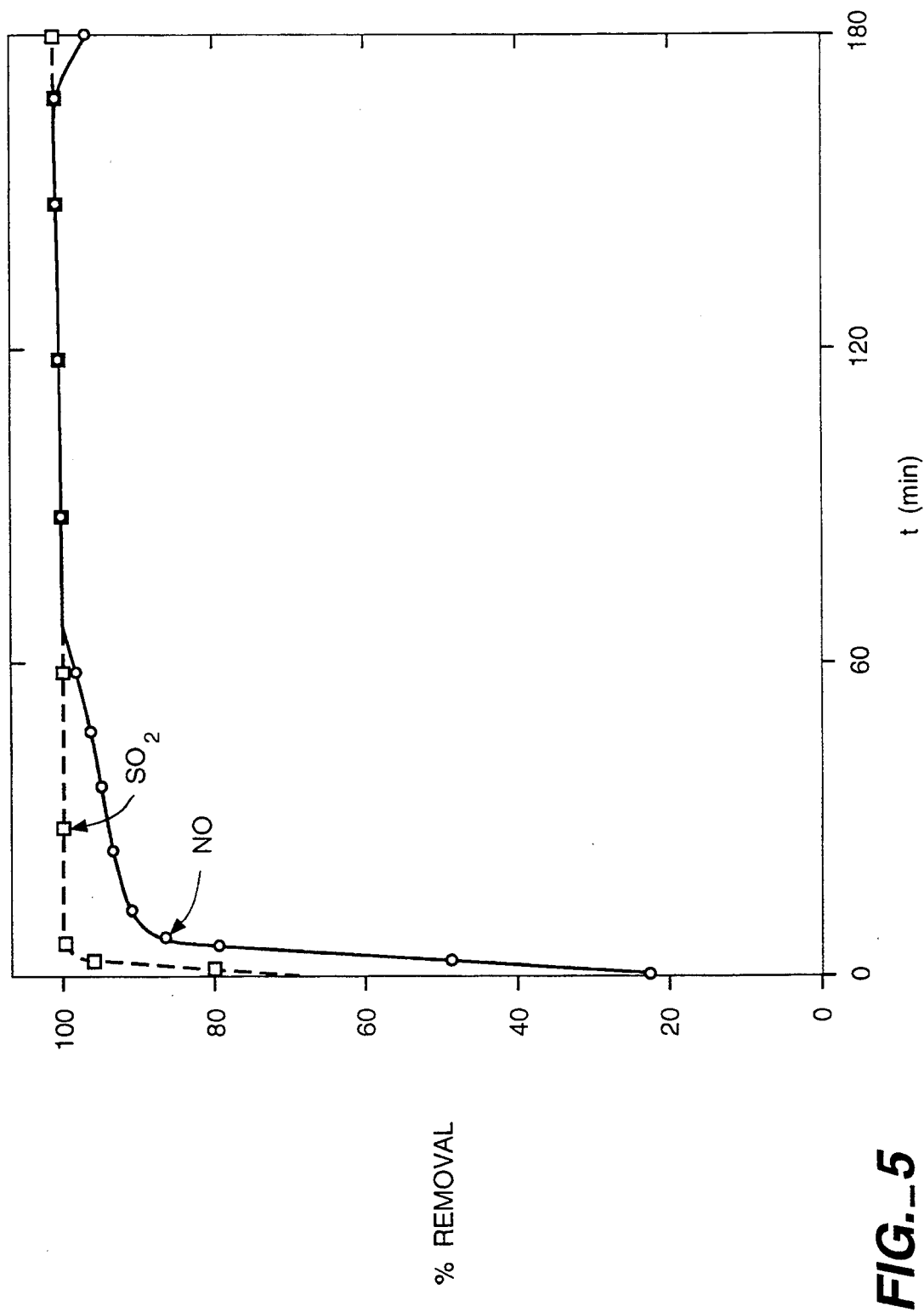
FIG._5

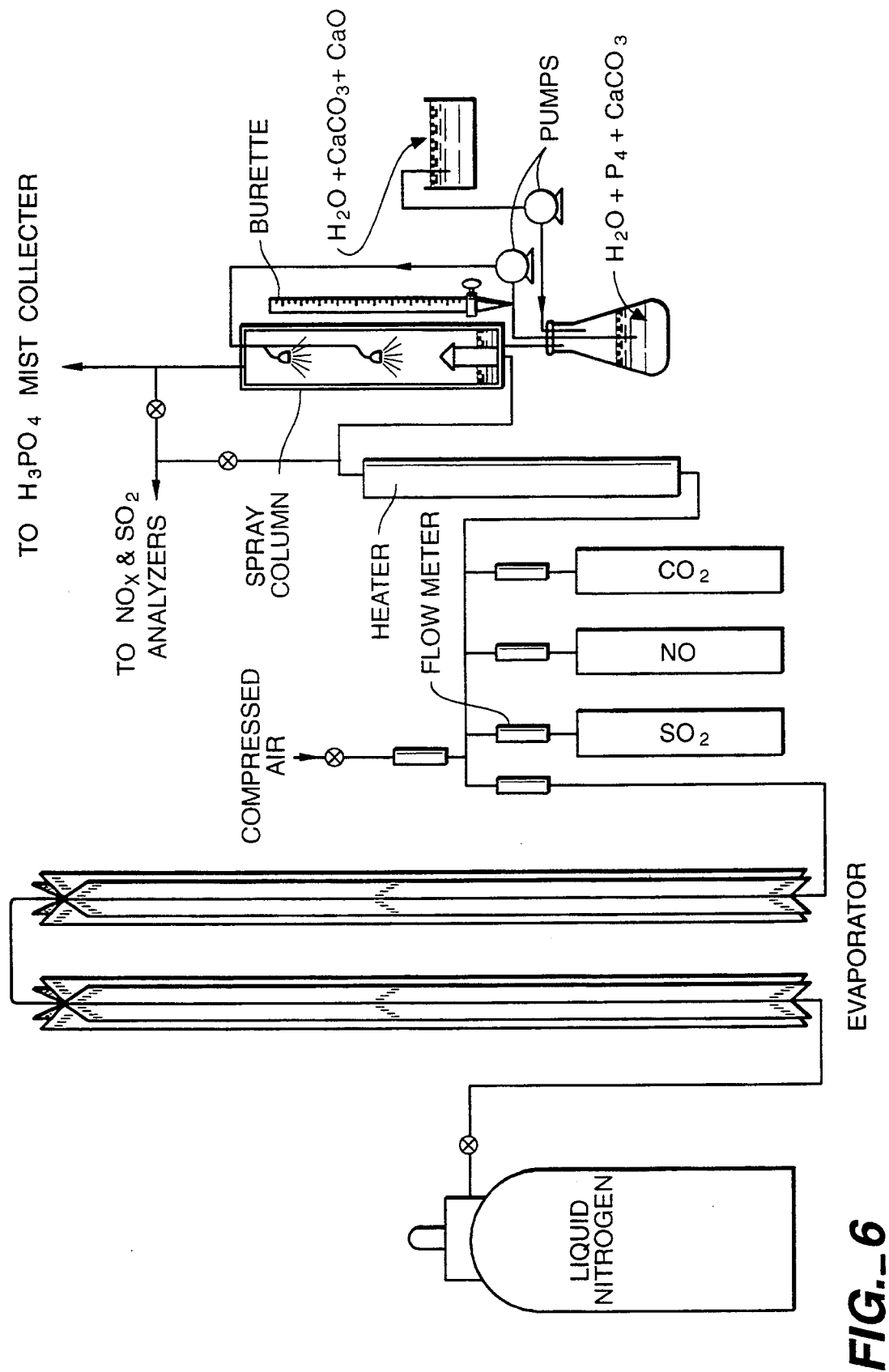
FIG._6

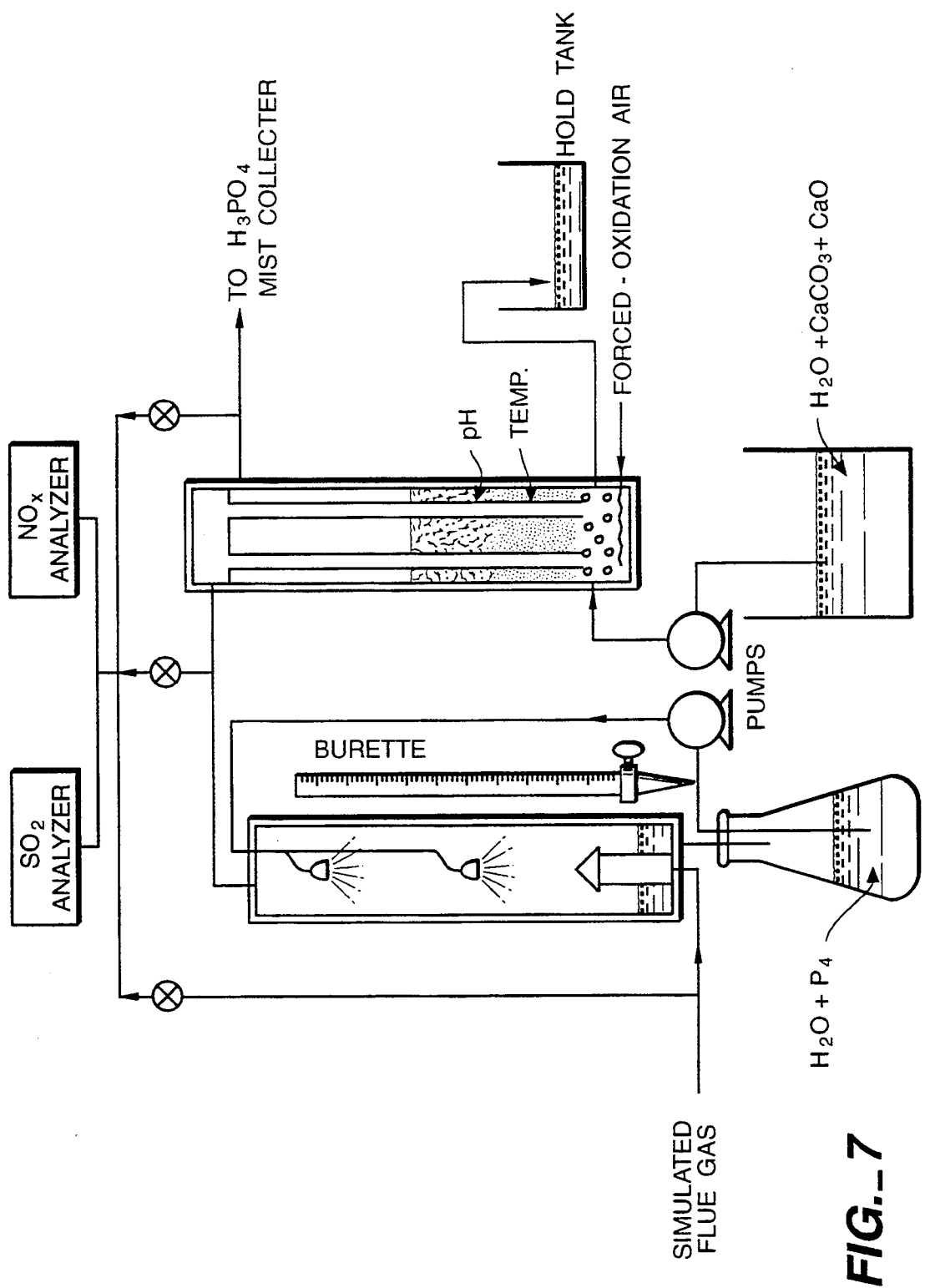
FIG._7

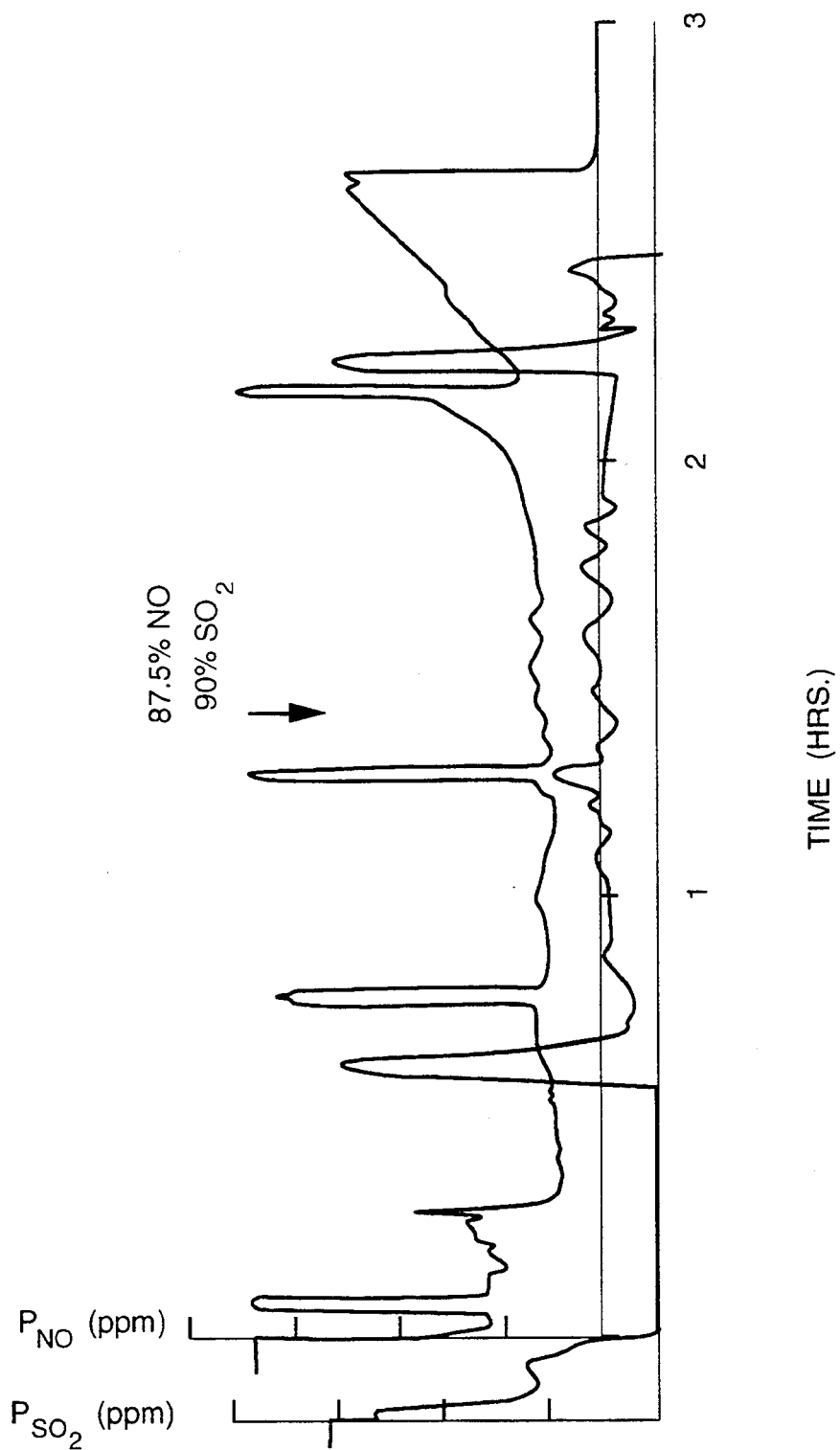
FIG._8

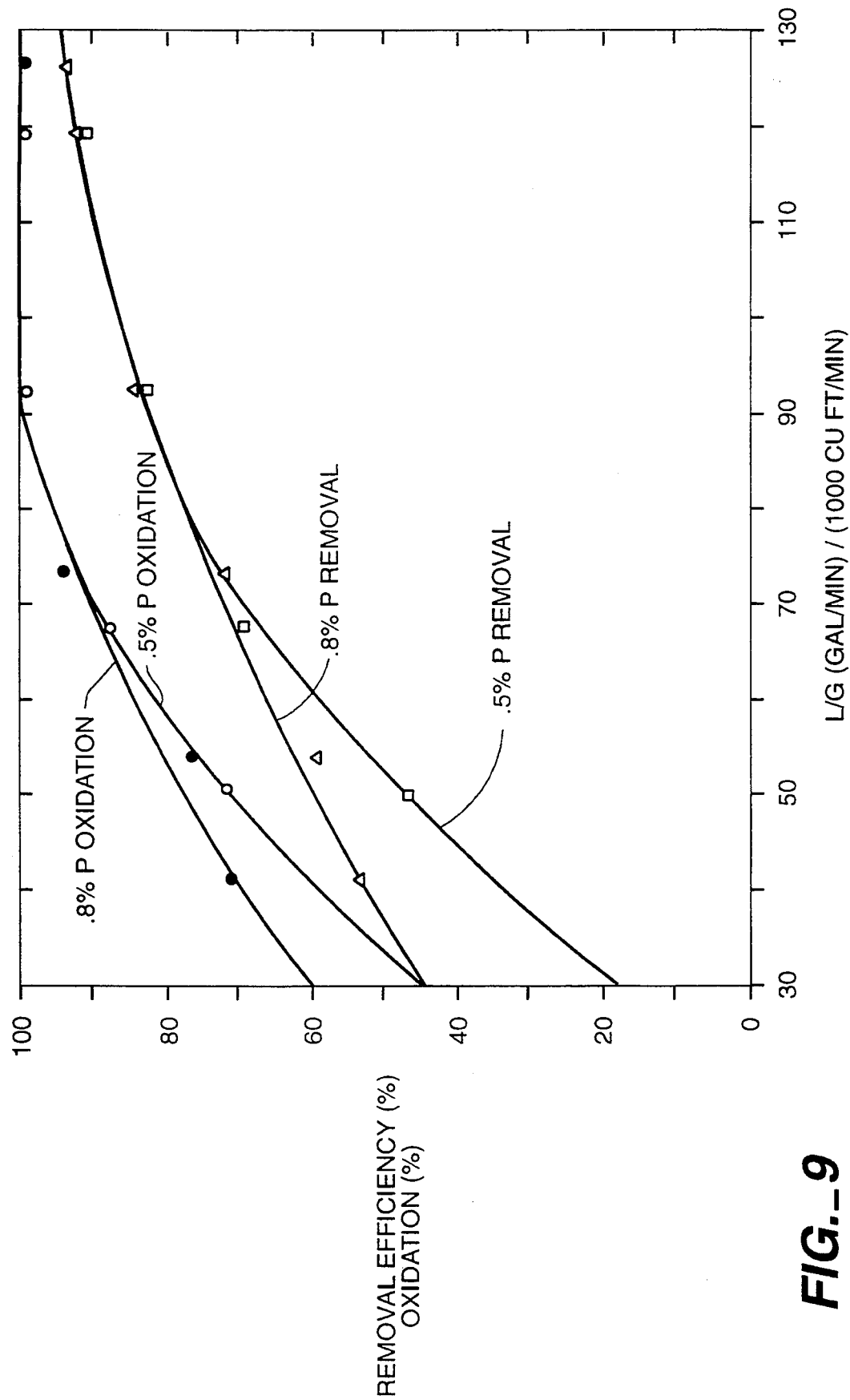
FIG._9

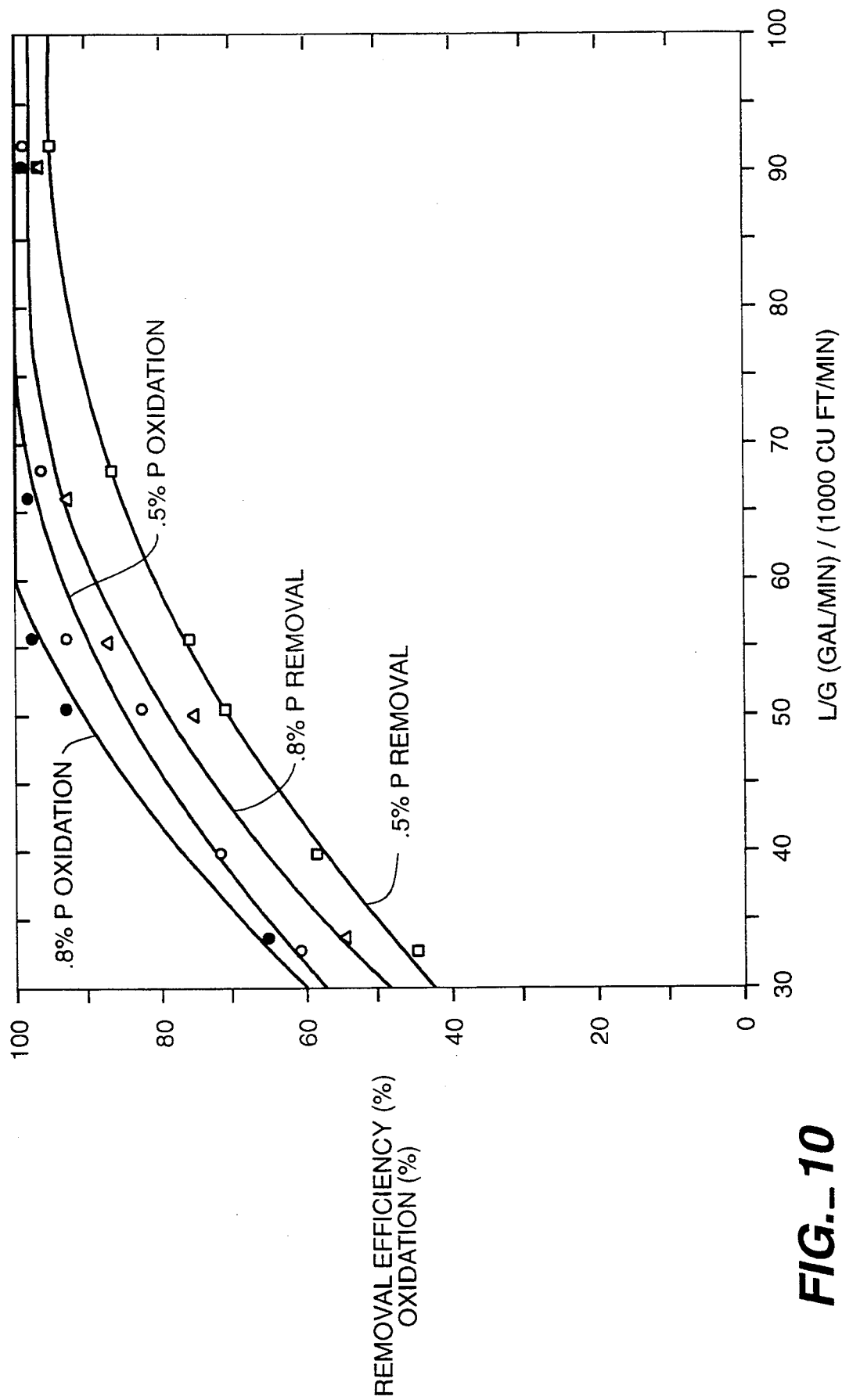
FIG._10

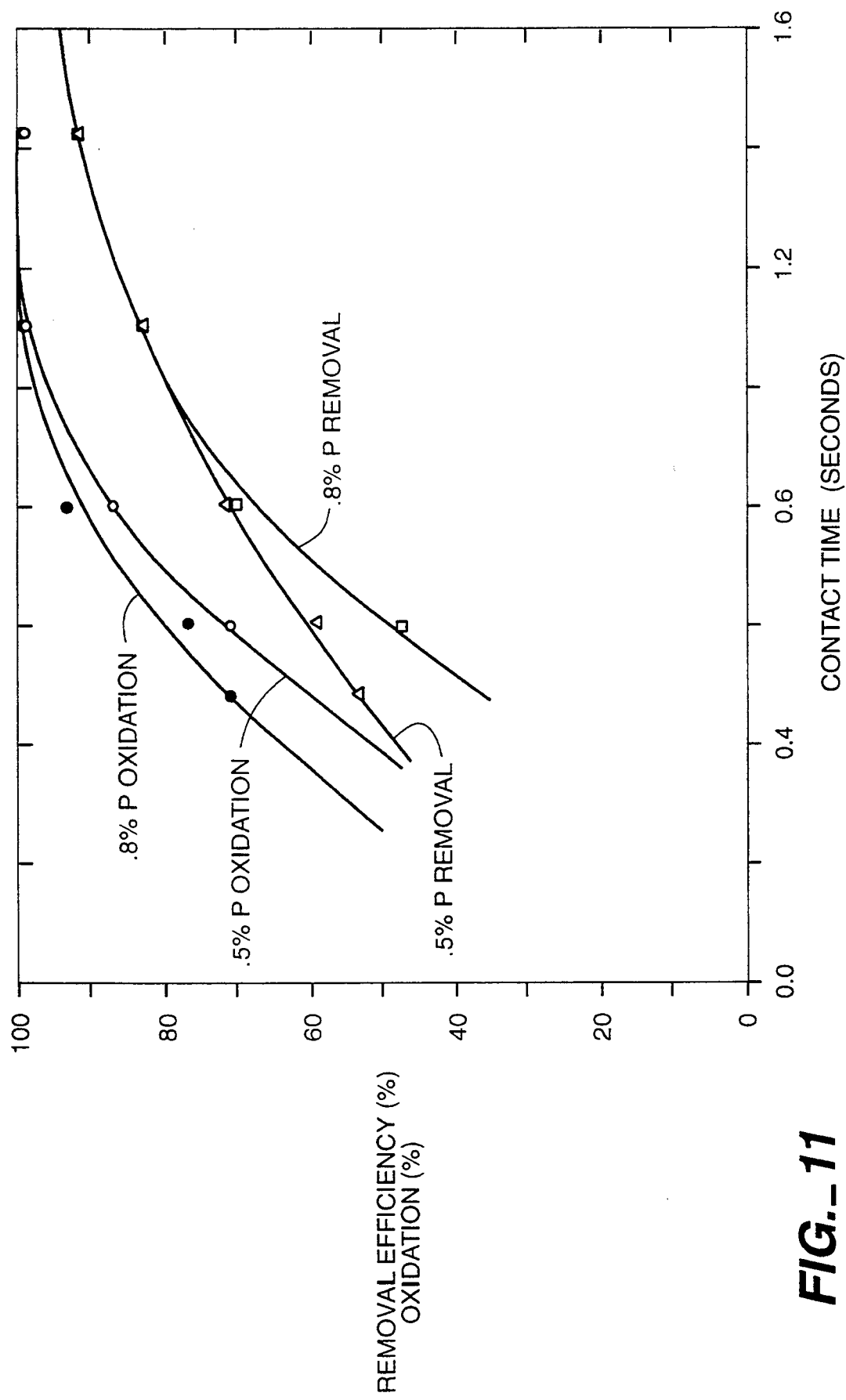
FIG._11

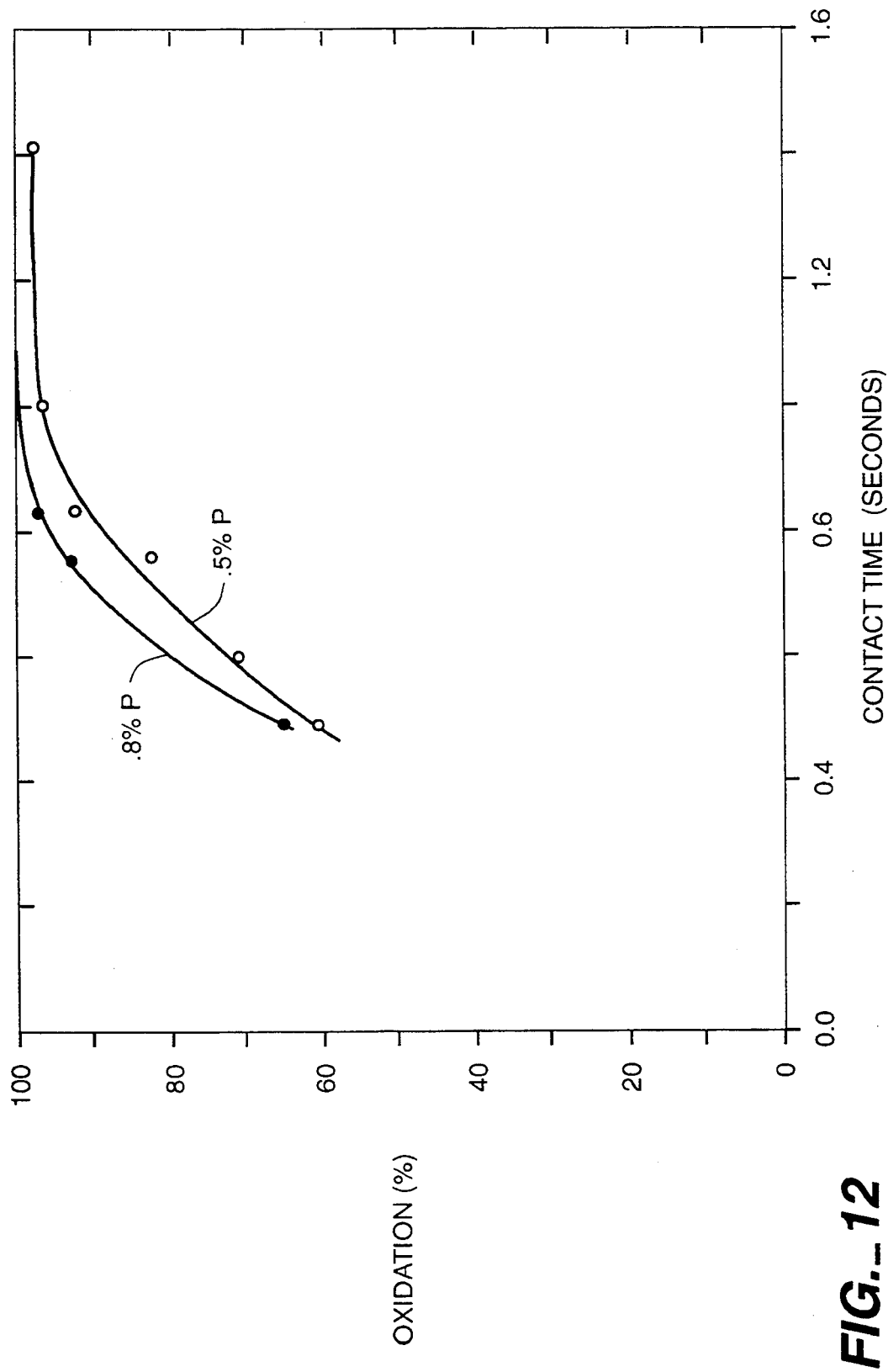
FIG._12

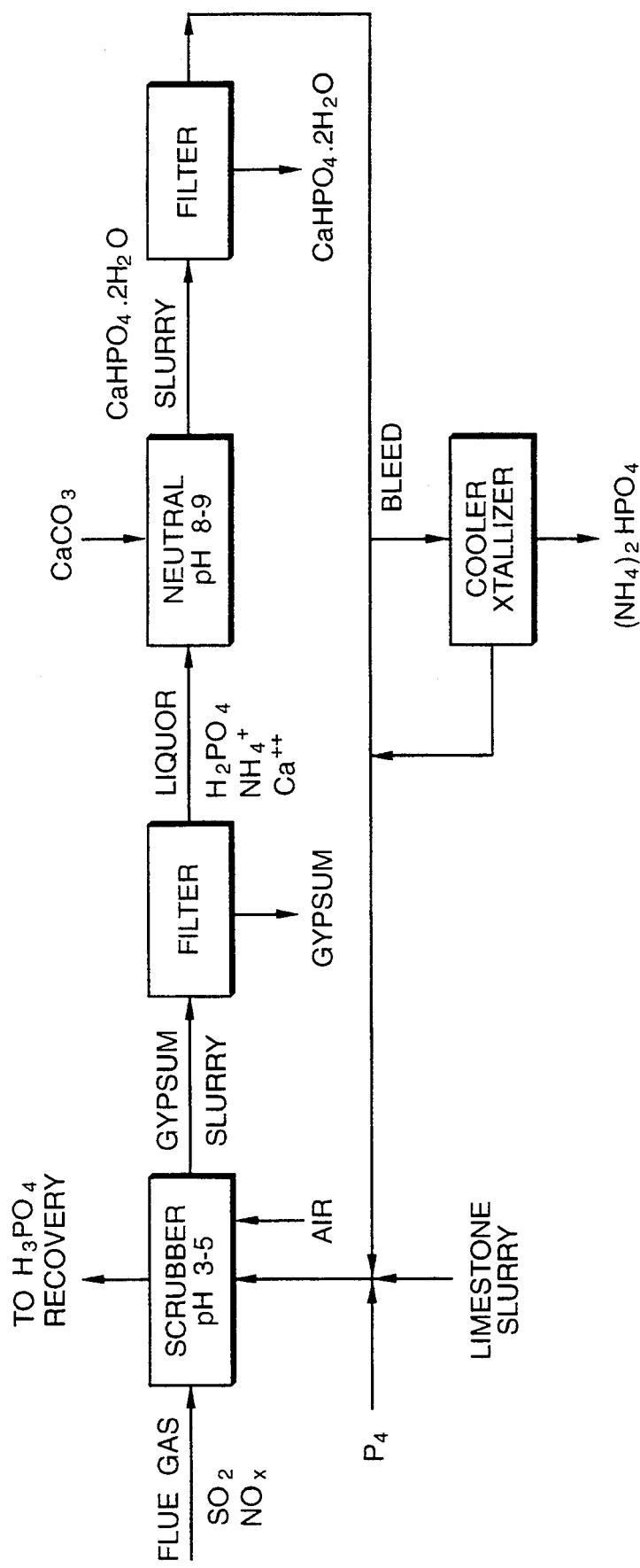
FIG._13

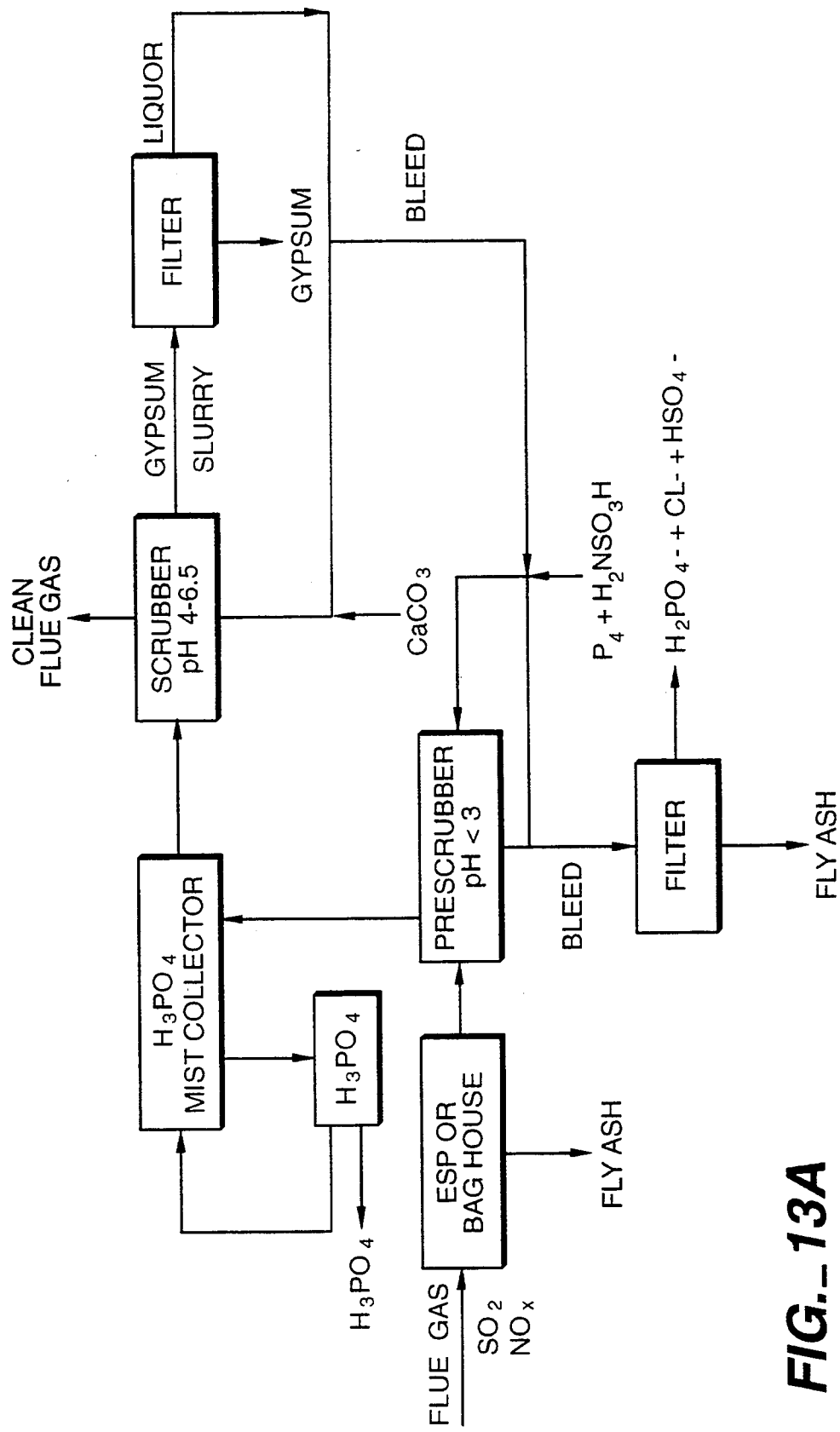
FIG._13A

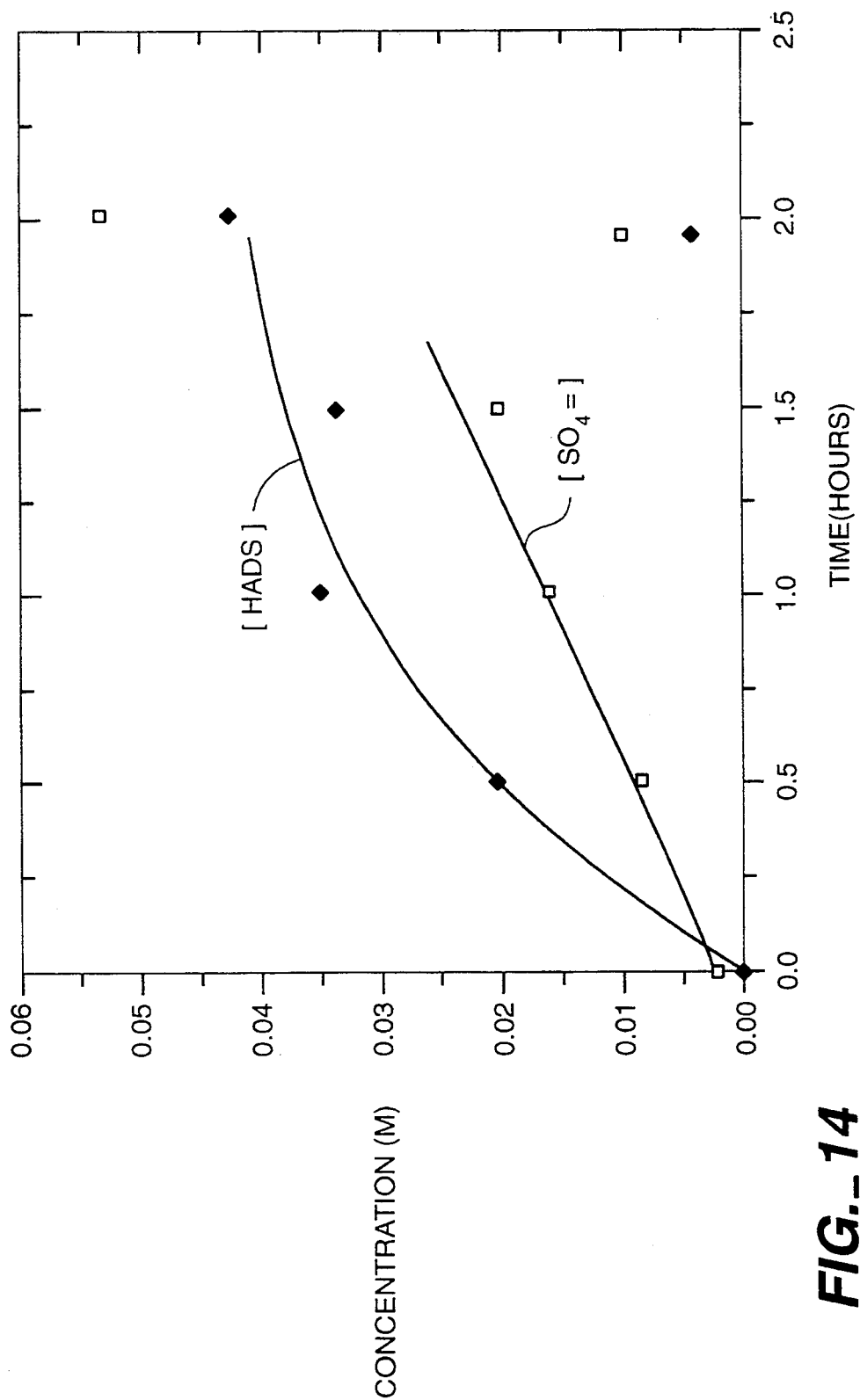
FIG._14

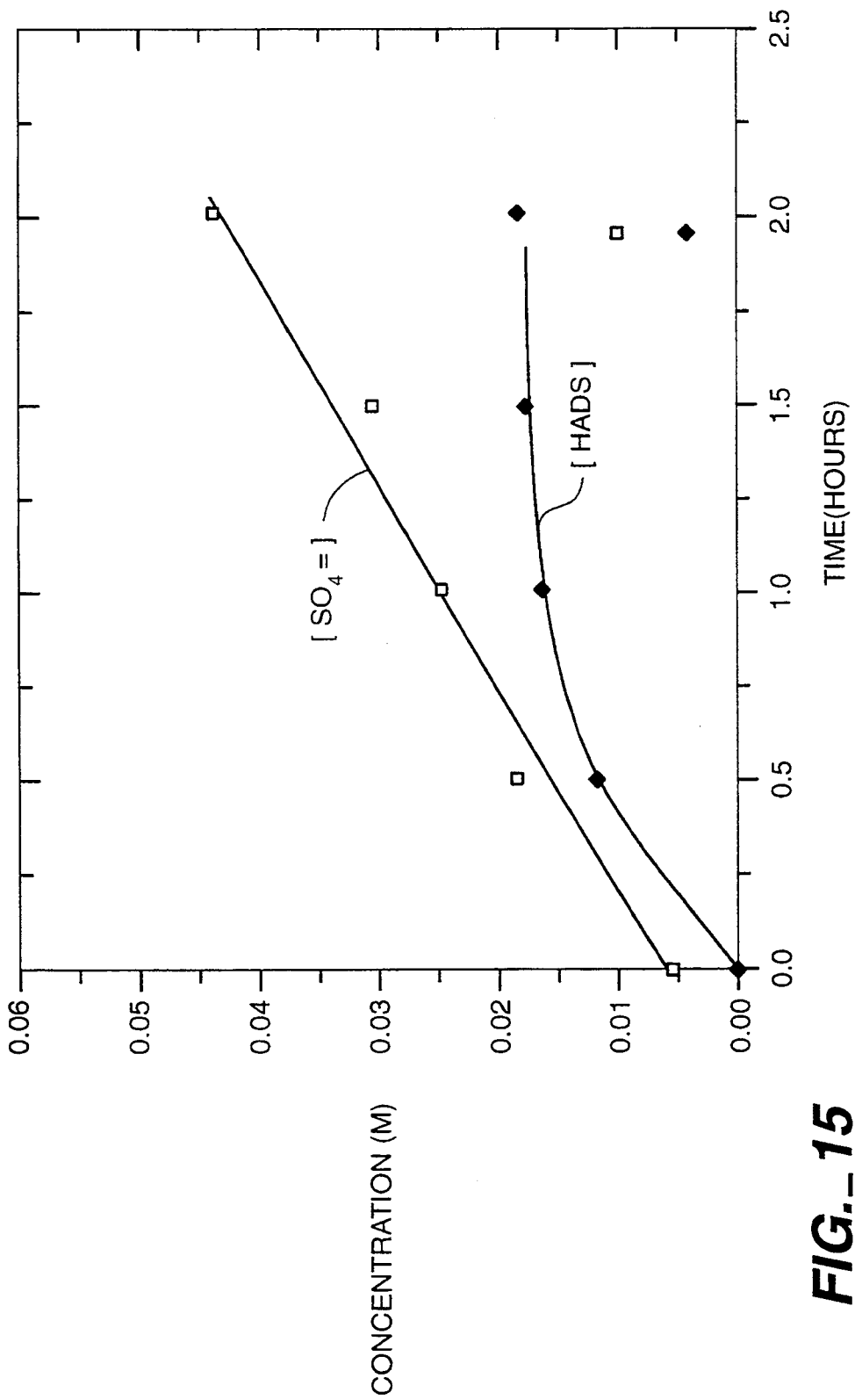
FIG._15

PROCESSES TO REMOVE ACID FORMING GASES FROM EXHAUST GASES

ORIGIN OF THE INVENTION

The present invention was supported in part by the U.S. Department of Energy under Contract No. DE-AC03-76SF00098 and administered through the Pittsburgh Energy Technology Center, Pittsburgh, Pa. The U.S. Government has specific rights in this invention.

RELATED DISCLOSURES

This application is a continuation-in-part application of U.S. Ser. No. 819,758 (now allowed), filed Jan. 13, 1992, and a continuation-in-part application of U.S. Ser. No. 518,722, (now U.S. Pat. No. 5,106,601) filed May 4, 1990 and of U.S. Ser. No. 261,229, (now U.S. Pat. No. 5,164,167) filed Oct. 24, 1988, all of which are incorporated herein by reference in their entirety.

BACKGROUND OF THE INVENTION

Field of the Invention

The present invention relates to an improved process to remove acid forming gases from exhaust gases. Specifically, the process relates to the use of an aqueous alkaline bisulfite/sulfite with a compound to convert $NO_x$ and/or $HNO_2$ rapidly to environmentally acceptable nitrogen.

The present invention relates to an improved process for the removal of acid gases including $NO_x$ from exhaust gases, particularly to a combined removal of $NO_x$ and $SO_2$ from flue gas and the like and also to the acquisition of valuable products from the process. (Flue gas usually contains both nitric oxide (NO) and nitric dioxide ($NO_2$); these oxides of nitrogen are collectively given as $NO_x$.

Concerns about air pollution caused by acid rain are increasing world wide, and considerable research effort is being expended to provide effective treatment of flue gases and other exhaust gases to remove acid forming components therefrom. However, the present methods have disadvantages which are particularly acute with respect to the removal of $NO_x$. In addition, the present methods are extremely costly.

Early methods were primarily used to remove pollutants when the concentrations were very high. As time goes by, and larger volumes of gases are generated, tolerable levels of emissions keep getting lower and lower. At this time emissions may be treated to obtain acceptable levels of $SO_2$ by means of scrubbing processes using aqueous solutions. However, removal of $NO_x$ presents problems, the most serious being sufficient removal and economic considerations. In addition, the economics of using two processes has prompted efforts to utilize wet scrubbing for removal of both $NO_x$ and $SO_2$ in a single process, and some success has been achieved in this direction. Due to the difficulty in solubilizing NO in aqueous solution, these processes have utilized expensive ingredients and often have provided other products requiring disposal.

Wet processes developed for removal of $NO_x$ have been reported. For example, Patent No. P 32 38 424.6 issued by the Federal Republic of Germany Apr. 19, 1984 to Hoechst AG utilizes red phosphorus in inert oxidizing media to remove NO and $NO_2$ from flue gas. However, the patent reports the treatment of very high concentrations of NO, typical concentrations being up in the thousands of parts per million, and in Example 7 of the patent where 1000 parts per million were treated, only 40% was removed. In the two part Example 9, the patentee reports 14,000 parts per million were treated in the first step to obtain a 90% removal to 1,300 parts per million; and in the second part about a 65% removal to about 460 parts per million. Such effluent concentrations are not sufficiently low enough, and we have found that red phosphorus is not satisfactory to treat concentrations of 500 parts per million or less.

Current $NO_x$ standards for power plant emissions may be attainable using the selective catalytic reduction (SCR) process which is very expensive. In addition, there is very limited experience with SCR on US coal with high sulfur content and variable ash composition. High $SO_2$ concentration promotes the formation of ammonium sulfate/bisulfate particulates, which result in the plugging of air heaters of boilers. Ash composition rich in arsenic and alkali could be detrimental to catalysts employed in the SCR system. Other approaches for the reductions to amounts less than 100 ppm are reported in U.S. Pat. No. 4,079,118 entitled Method for Removing Nitrogen Oxides Using Ferricion-EDTA Complex Solutions issued Mar. 14, 1978, and various other wet processes have been developed to provide efficient removal of $NO_x$. However, these processes generally require either the use of expensive starting materials or create a disposal problem for the products of the processes or both.

Numerous other patents have been issued which disclose wet processes for removal of $NO_x$ such as U.S. Pat. No. 3,984,522; U.S. Pat. No. 4,079,118 and U.S. Pat. No. 4,158,044. In addition, many patents have issued which disclose combined processes for removal of both $SO_2$ and $NO_x$. Examples of such patents include U.S. Pat. Nos. 4,126,529 and 4,347,227. Many other systems have been suggested, and the list is too long to include them all. However, there is much room for improvement in providing a practical, efficient removal process for both of such pollutants either individually or together.

As mentioned above, sulfur oxides can be effectively removed by flue gas desulfurization scrubbers. The majority of these scrubbers now in use involve wet limestone processes, which utilize aqueous slurries of limestone to neutralize the sulfurous and/or sulfuric acids produced from the dissolution and subsequent oxidation of flue gas $SO_2$ in scrubbing liquors. The resulting solid slurries, containing $CaSO_3.\frac{1}{2}H_2O$ and gypsum ($CaSO_4.2H_2O$), can be hauled away for disposal. Such practice is common among power plants located in areas where landfill space is abundant. On the other hand, the more practical solution for power plants situated in densely populated areas is to operate the scrubbers under forced oxidation conditions. Under those circumstances, the major by-product of the scrubbing process is gypsum, which is of some commercial value as a building material.

Further versatility in the processing by flue gas desulfurization scrubbers is obtained by utilizing other alkalis besides limestone or lime. These include soda ash ($Na_2CO_3$), nahcolite ($NaHCO_3$), trona ($Na_2CO_3.3NaHCO_3$), $Na_2SO_3$, NaOH, KOH, $K_2CO_3/KHCO_3$, magnesite ($MgCO_3$), dolomite ($CaCO_3/MgCO_3$), $NH_4OH$, and $(NH_4)_2CO_3/NH_4HCO_3$. These materials are more expensive than limestone and are more often used in chemical industries where the volume of waste gas to be treated is small compared to those from power plants, and where the plants are in close proximity to the production sites of those alkalis.

While the wet flue gas desulfurization scrubbers described above are very efficient in the removal of $SO_2$ from flue gas, they are incapable of removing sufficient NO because of its low solubility in aqueous solution. NO makes up about 95% of the $NO_x$ in most flue or exhaust gases. The installation of a separate scrubber for flue gas denitrification generally requires additional capital investment. Accordingly, approaches to modify existing wet flue gas desulfurization processes for the simultaneous removal of $SO_2$ and $NO_x$ emissions have been under world wide investigation.

Several methods have been developed to enhance the absorption of $NO_x$ in scrubbing liquors. These include the oxidation of NO to the more soluble $NO_2$ using oxidants such as $O_3$, $ClO_2$, and $KMnO_4$, as well as the addition of various iron (II) chelates to the scrubbing liquors to bind and activate NO (See, H. I. Faucett, J. D. Maxell and T. A. Burnett, "Technical Assessment of $NO_x$ Removal Process for Utility Application", EPRI AF-568, EPA600/7-77-127 March, 1978). So far, none of these methods has been demonstrated to be cost effective, despite high removal efficiencies of both $SO_2$ and $NO_x$.

EXHAUST GAS $SO_2$ AND $NO_x$ EMISSION REDUCTION—The requirement to control $SO_2$ and $NO_x$ emissions to the atmosphere has become mandatory. $SO_2$ is soluble and can be removed from flue gas by an alkaline aqueous solution and/or slurry. $SO_2$ is neutralized by alkaline reagents to form bisulfite/sulfite ions; sulfate ion is also formed in the presence of $O_2$. Processes such as limestone, lime, sodium, Dual-alkaline, Wellman-Lord, Union Carbide's Cansolv and Dow Chemical Company's amine systems are based on this principle. However, these processes are not capable of removing $NO_x$, because most of the $NO_x$ in flue gas is present as NO, which is substantially insoluble in water.

One approach to circumvent this problem is to oxidize NO to the more soluble $NO_2$ by an oxidant such as $O_3$, or $ClO_2$, or by oxidants produced from the reaction of yellow phosphorus with $O_2$ ($P_4/O_2$). Nevertheless, there are two problems associated with this approach:

(1) the slow hydrolysis rate of $NO_2$, and (2) the formation of nitrite and nitrate ions. Various nitrogen-sulfur compounds are also formed in scrubbing liquors when $SO_2$ is simultaneously removed with $NO_2$ in one absorber.

The first problem results in the requirement of a large liquid/gas (L/G) ratio in the absorber to achieve a desirable $NO_x$ removal efficiency. The second problem results in a mixture of nitrogen-sulfur compounds and the requirement for the subsequent treatment of the scrubbing liquors containing them.

Numerous patents have been issued which disclose wet processes for the removal of $NO_x$ through the oxidation of NO to $NO_2$ by an oxidant. These include, for example:

Japanese Patent No. 75,01,964 uses $ClO_2$ to oxidize NO to $NO_2$, which is then scrubbed with a $Na_2SO_3$ solution.

Canadian Patent No. 1,021,922 and West German Patent No. 2,416,980 both use $O_3$ or $ClO_2$ to oxidize NO to $NO_2$ which is then scrubbed with aqueous $NaClO_2$ to form $HNO_3$.

West German Patent No. 2,600,034 uses $ClO_2$ or $O_3$ to oxidize NO to $NO_2$, followed by scrubbing $NO_2$ with an aqueous mixture containing alkali metal sulfite and a catalyst selected from o-aminophenol, trinitrophenol, triethylenediamine, or triaminophenol.

Japanese Patent No. 78,75,187 discloses the use of $ClO_2$ to oxidize NO to $NO_2$ which is then scrubbed with an aqueous thiourea solution.

Japanese Patent No. 79,39,368 uses $ClO_2$ or $O_3$ to oxidize NO to $NO_2$, which is then scrubbed with aqueous NaOH solutions.

Japanese Patent No. 79,35,870 uses $ClO_2$ to oxidize NO to $NO_2$ which is subsequently irradiated with UV light.

Japanese Patent No. 90,169,012 uses $ClO_2$ and then an aqueous $Na_2S$ solution to remove NO.

In addition, many patents have been issued which disclose the combined removal of $SO_2$ and $NO_x$. Examples of such patents include, for example:

Japanese Patent No. 74,130,361, which uses an aqueous lime solution to neutralize $SO_2$, and $ClO_2$ followed by an aqueous $NaClO_2$ to oxidize NO to $HNO_3$.

Japanese Patent No. 75,10,778, which uses a calcium salt solution to neutralize $SO_2$ and $ClO_2$ to oxidize NO to $NO_2$ which is then scrubbed with $SO_3^{-2}$ solutions to remove $NO_2$.

Japanese Patent No. 75,131,851, which uses $ClO_2$ to oxidize NO to $NO_2$ which is then scrubbed with aqueous alkali metal bicarbonate and alkali metal sulfites to remove $NO_2$ and $SO_2$.

Japanese Patent No. 75,131,853, which uses sodium and calcium salt solutions to neutralize $SO_2$, and $ClO_2$ to oxidize NO to $NO_2$, followed by using $Na_2SO_3$ solutions to absorb $NO_2$.

Japanese Patent No. 77,122,264, which uses $ClO_2$ to oxidize NO to $NO_2$, and followed by ammonium solutions to neutralize $SO_2$ and $NO_2$.

Japanese Patent No. 77,125,469 uses $ClO_2$ to oxidize NO to $NO_2$, followed by scrubbing $NO_2$ and $SO_2$ with an alkaline quinone/hydroquinone solution.

West German Patent No. 2,559,546 uses $O_3$ and $ClO_2$ to oxidize NO to $NO_2$, followed by scrubbing $NO_2$ and $SO_2$ with an aqueous solution of alkali sulfite containing sulfide, polysulfide, thiosulfate, or thiourea as an oxidation inhibitor.

Japanese Patent No. 78,144,456 uses $O_3$ to oxidize NO to $NO_2$, followed by scrubbing with a desulfurization solution to remove $NO_2$ and $SO_2$.

Japanese Patent No. 79,33,274 uses $CaCl_2$ solution to neutralize $SO_2$ and $ClO_2$ together with near UV radiation to oxidize NO and $NO_2$ to $HNO_3$.

What is needed is a simple process to dissolve NO or its reaction products in aqueous alkaline solution followed by reduction using bisulfite/sulfite with a nitrogen-containing compound or an SH-containing compound which can react with $HNO_2$ rapidly to produce environmentally acceptable products such as nitrogen. Preferred compounds are urea and sulfamic acid, especially sulfamic acid. The present invention accomplishes this result.

SUMMARY OF THE INVENTION

In one aspect the present invention relates to a process for reducing the concentration of NO in a gas, which process comprises:

(A) contacting a gas sample containing NO with a gaseous oxidizing agent to oxidize the NO to $NO_2$;

(B) contacting the gas sample of step (A) comprising $NO_2$ with an aqueous reagent of bisulfite/sulfite and a compound selected from urea, sulfamic acid, hydrazinium ion, hydrazoic acid, nitroaniline, sulfanilamide, sulfanilic acid, mercaptopropanoic acid, mercaptosuccinic acid, cysteine or combinations thereof at between about 0° and 100° C. at a pH of between about 1 and 7 for between about 0.01 and 60 sec; and (C) optionally contacting the reaction product of step (A) with conventional chemical reagents to reduce the concentrations of the organic products of the reaction in step (B) to environ-mentally acceptable levels.

In another aspect, the present invention concerns a process for reducing the concentration of NO in a gas, which process comprises:

(a) contacting a gas sample containing NO with a gaseous oxidizing agent independently selected from $O_3$, $ClO_2$, or a gaseous product of $P_4/O_2$, or combinations thereof to substantially produce $NO_2$, and (b) contacting the gaseous sample of step (a) with aqueous reagents comprising bisulfite/sulfite and a compound selected from urea, sulfamic acid or combinations thereof at between about 5° and 95° C. at a pH of between 1 and 7 for between about 0.01 and 60 sec in an amount sufficient to substantially convert the nitrogen atom in the $NO_2$ present to nitrogen.

Another object of this invention is to provide a wet scrubbing process wherein $NO_x$ may be removed from exhaust gases such as flue gas to a degree that the remaining concentrations may be lower than 200 parts per million, and, if desired, lower than 10 to 20 parts per million by volume.

This objective is achieved by a method of treating exhaust gases containing $NO_x$ comprising the step of contacting the exhaust gas with an aqueous emulsion or suspension containing yellow phosphorus ($P_4$). The contact of the exhaust gas may be by any suitable contact method such as in a spray type or a bubbling type absorber. At least some oxygen or oxygen source must be present in the exhaust gases, and most exhaust gases contain a sufficient amount; however, air or other sources of oxygen may be added to the exhaust gas when needed or wanted. The pressure is not critical, and the process is generally carried out at ambient or such positive pressures needed to move the gases through a scrubber.

The temperature of the process is operative throughout the liquid range for water, and optimally in the range of about 20° C. to about 95° C., with a preferred range of about 45° C. to 75° C. The concentration of yellow phosphorus (also known as white phosphorus) required is rather low because any amount is functional, but it should be above about 0.01% in the aqueous emulsion or suspension and best above 0.1%. The high level would be any amount that allows for enough water to carry out the reactions and provide the desired safety conditions, and could be 20% or even higher at the front end of the contacting apparatus. A preferred range would be about 0.1 to 10% by weight in order to obtain good results, and optimally from 0.2 to 3% by weight. The pH may also vary over a large range and any pH appears to be operative for purposes of oxidizing the $P_4$. However, for removing (i.e. absorbing) $NO_x$ and also other materials such as $SO_2$ the pH should be about 3.0 or above, in the range of about 3.0–9.0, preferably 3.0–7.0. A pH higher than 9.0 can give undesirable by-products.

Another primary object of the invention is to produce a phosphoric acid ($H_3PO_4$) product during the $NO_x$ removal process.

In this process the yellow phosphorus oxidizes to $P_4O_{10}$, commonly called phosphorus pentaoxide or $P_2O_5$, during contact of the phosphorus aqueous emulsion or suspension with the exhaust gases. The $P_4O_{10}$ then associates with water droplets or water vapor to become phosphoric acid in the form of a white smoke or phosphoric acid mist which can be collected by various methods. The minimum contact time of the phosphorus emulsion or suspension with the exhaust gases should be about 0.5 seconds for a spray type scrubber and about 0.05 seconds in a bubbling type scrubber. When the pH of the emulsion or suspension is about 3 or greater, the scrubber becomes an absorber of $NO_2$ and $SO_2$ and the duration of the contact time becomes critical in that too long a contact time will result in the $P_4$ being converted to phosphates. For the purpose of recovering phosphoric acid the contact time should be no longer than about 10 seconds in a spray type absorber and about 3.5 seconds in a bubbling type absorber.

Another object of the invention is to provide a process wherein both $NO_x$ and $SO_2$ are removed in a single process using an apparatus which is now conventional in $SO_2$ removal processes, and wherein valuable by-products are obtained.

As indicated above, the yellow phosphorus emulsions or suspensions are especially suitable when the pH is adjusted to within the range of about 3.0 to about 9.0, and such adjustment, if needed, may be made by using any suitable alkaline material. When the emulsion is kept alkaline, $NO_2$ and sulfur dioxides are also removed. By using limestone, or one of the alkalis mentioned in the background section above for flue gas desulfurization, the advantages of such processes are obtained along with removal of $NO_x$. The resulting by-products could therefore include phosphate, nitrate, and sulfate salts of calcium, magnesium, sodium, potassium and ammonium. These products are important nutrients for plants and constitute the major components of fertilizers.

Still another object of the invention is for phosphoric acid to be the by-product in the $NO_x$ and $SO_2$ removal process which uses an apparatus conventional in $SO_2$ removal processes.

A further object of the invention is the provision of a process for removing $NO_x$ and $SO_2$ from flue gas and the like which is capable of taking out substantial amounts of the $NO_x$ (about 20%–95%) and $SO_2$ (about 40%–98%) from the flue gas, and which also provides suitable by-products from the process.

Further objects and advantages will be apparent as the specification proceeds and the preferred embodiments are described in detail.

BRIEF DESCRIPTION OF THE DRAWINGS

FIG. 1 illustrates data in graphical form obtained from a group of experiments wherein NO is removed from a simulated flue gas using different amounts of yellow phosphorus.

FIG. 2 shows data in graphical form obtained from a group of experiments wherein NO is removed from a simulated flue gas using yellow phosphorus emulsions at various temperatures.

FIG. 3 shows data in graphical form obtained from a group of experiments wherein NO is removed from a simulated flue gas using an aqueous emulsion of yellow phosphorus at various pH conditions.

FIG. 4 shows data in graphical form obtained from a group of experiments wherein NO is removed from a simulated flue gas using yellow phosphorus and wherein the amount of oxygen in the flue gas is varied.

FIG. 5 shows data in graphical form obtained from an experiment wherein both NO and $SO_2$ are removed from a simulated flue gas using a mixture of an aqueous emulsion of yellow phosphorus and a slurry of limestone.

FIG. 6 is a schematic diagram illustrating a 20 acfm bench-scale wet phosphorus/limestone process using a spray tower scrubber.

FIG. 7 is a schematic diagram illustrating a bench-scale Bechtel CT-121 type scrubber consisting of a spray tower prescrubber and a bubbling absorber.

FIG. 8 shows data in graphical form obtained from an experiment wherein NO is removed from a simulated flue gas over a period of about three hours using a yellow phosphorus emulsion in a prescrubber and a limestone slurry in a bubbling absorber. The P/NO ratio determined for this run was 0.73.

FIG. 9 shows data in graphical form obtained from a group of experiments wherein NO is oxidized and removed from a simulated flue gas in a spray tower scrubber wherein the flow rate of the simulated flue gas is varied and contains 310 ppm NO, 2000 ppm $SO_2$ and 5% $O_2$.

FIG. 10 shows data in graphical form obtained from a group of experiments wherein NO is oxidized in a spray tower prescrubber and removed in a bubbling absorber type scrubber.

FIG. 11 shows data in graphical form obtained from a group of experiments wherein NO is oxidized and removed from a simulated flue gas using a yellow phosphorus and limestone aqueous mixture in a spray tower scrubber and the contact time is varied.

FIG. 12 shows data in graphical form obtained from a group of experiments wherein NO is oxidized using yellow phosphorus in a CT-121 type prescrubber and the contact time is varied.

FIGS. 13 and 13A are a conceptual flow diagram of a wet phosphorus limestone process for combined removal of $SO_2$ and $NO_x$.

FIG. 14 shows in graphic form the time dependent production of hydroxylamine disulfonate (HADS) without sulfamate present.

FIG. 15 shows in graphic form the time dependent production of hydroxylamine disulfonate (HADS) with sulfamate present.

DETAILED DESCRIPTION OF THE INVENTION

Certain fuels are already low in sulfur, and other fuels have been treated to remove sulfur prior to combustion. In such cases, sulfur oxide pollution is not a serious problem and generally the exhaust gases are discharged to the atmosphere without treatment. These fuels frequently contain nitrogen compounds that appear in the exhaust gas as $NO_x$. In addition, $NO_x$ may be produced from high temperature decomposition of $N_2$ and $O_2$ in air during the combustion and it is now desired to treat such exhaust gases. For example, power plants using natural gas in California emit exhaust gases with the $NO_x$ concentration greater than 75 parts per million, while the California standards are being set to require emissions of less than 25 parts per million $NO_x$.

We have discovered that $NO_x$ can be removed from flue gas using an aqueous emulsion containing liquid yellow phosphorus. The factors influencing the effectiveness of NO removal of our system relate to the NO oxidation efficiency and include the amount of phosphorus used, the temperature of the aqueous emulsion, the pH of the aqueous emulsion, the contact time of the gases with the emulsion and the $O_2$ concentration in the flue gas.

As used herein, we express the effectiveness for NO removal of a yellow phosphorus emulsion as the stoichiometric ratio P/NO, which is defined as the number of moles of phosphorus needed to remove one mole of NO averaged over the entire period of an experiment (usually 2 hours). Therefore, the higher the stoichiometric ratio, the more phosphorus is required to remove each mole of NO, the lower the effectiveness for NO removal and vice versa.

It should be pointed out that the reaction mechanism for NO removal by yellow phosphorus is distinctively different from that using red phosphorus. The reaction between yellow phosphorus and NO appears to take place in both aqueous and gas phase due to the low melting point (44.1° C.) and high vapor pressure of yellow phosphorus. On the other hand, red phosphorus at atmospheric pressure is solid up to a temperature of about 417° C. (where it sublimes), and therefore has a very low vapor pressure at the reaction temperatures employed herein (about 20° C. to 95° C.). In this case, the absorption of NO is likely to be solid-gas type. Furthermore, the NO-derived products using yellow phosphorus have been determined to include $NO_2^-$ and $NO_3^-$, both oxidation products of NO, whereas in the case of red phosphorus, it was claimed in the Hoechst AG patent (cited above) that $N_2$, a reduction product of NO, was the only nitrogen product obtained. The difference in NO-derived products in these two cases also suggests different reaction mechanisms are involved.

The phosphorus oxidation process may also be directed to the production of phosphoric acid. The experiments such as those in Examples 1, 2, 3, 4 (infra) which removed $NO_x$ from simulated flue gas were all carried out in a 2 inch diameter bubbling absorber column with 200 ml of reaction mixture. The gas flow rate in these experiments was about $3.5 \times 10^{-2}$ acfm (1 liter/min), corresponding to a superficial gas velocity of 0.028 ft/sec in the absorption column and a contact time of flue gas with scrubbing liquors of approximately 12 sec. However, in a commercial scrubber system, the superficial velocity of flue gas is much faster (8–12 ft/sec), and the contact time much shorter (2–5 sec). Consequently, the mass transfer and chemical reaction kinetics are less favorable under the conditions of a commercial system. In order to determine whether the $P_4$ additive is still effective with wet limestone systems at realistic conditions, a 20 acfm bench-scale scrubber system was constructed that simulates as close as possible the conditions of a commercial system. Under these conditions, the major oxidation product of $P_4$ is phosphoric acid. In the phosphorus oxidation process finely divided phosphorus pentaoxides are generated which pick up moisture to form phosphoric acid aerosols giving the appearance of white smoke. Recovery of the white smoke yields a valuable by-product, phosphoric acid. A preferred method of recovery is to absorb the phosphorus "white smoke" with concentrated phosphoric acid (40–60%).

The P/NO ratios determined were in the range of about 1.0–1.5 when a bench-scale spray tower was used as the absorber, and about 0.6–1.0 when the CT-121 type bubbling configuration was the absorber. The P/NO ratios were determined from batch runs. A known weight of $P_4$ was added in water, then the experiment was carried out until the NO removal reached zero. By integrating the NO removal curve for the entire period of the experiment, and knowing the amount of $P_4$ used, the P/NO ratio was calculated. A P/NO determination for a constant removal efficiency of NO has not been performed.

An investigation of factors affecting P/NO is underway. A large amount of O (atomic oxygen) was detected in the reaction zone during the reaction of $P_4$ with $O_2$. The reaction is believed to proceed via a branched-chain mechanism. (See, N. N. Semenov. "Die Oxydation des Phosphordampfes bei Niedrigen Drucken." *Z. Phys.* 46, 109, 1927.) Investigators have identified several elementary reactions involved in the chain, and have determined rate constants for some of the reactions. However, a complete list of elementary reactions is not yet available. Dainton and Kimberly (See, F. S. Dainton and H. M. Kimberly. "Reaction between Phosphorus Vapor and Oxygen." *Trans. Faraday Soc.* 46, 629, 1950.) have proposed the following reaction scheme:

$$P_4 + O_2 \rightarrow P_4O + O \tag{1}$$

$$P_4O_n + O_2 \rightarrow P_4O_{n+1} + O \tag{2}$$

where $n = 1, 2, \ldots 9$

The overall reaction is $$P_4 + 10\, O_2 \rightarrow P_4O_{10} + 10O \tag{3}$$

The reaction of O with $O_2$ forms $O_3$:

$$10O + 10\, O_2 + 10M \rightarrow 10\, O_3 + 10M \tag{4}$$

According to this reaction scheme, each $P_4$ reacts with 10 $O_2$ to generate 10 $O_3$. If all the $O_3$ produced oxidizes NO to $NO_2$, the P/NO ratio will be 0.4, provided the removal of NO occurs by the dissolution of $NO_2$ (or $N_2O_4$). The P/NO ratio will be 0.2 if the removal of NO occurs by the dissolution of $N_2O_3$. In reality, the dissolution of a mixture of $NO_2$ and $N_2O_3$ in the scrubbing liquor is more likely. The $O_3$ generated may be consumed by reaction with $SO_2$ through gas phase as well as liquid phase reactions, which would increase the P/NO ratio. The gas phase reaction $SO_2 + O_3 \rightarrow SO_3 + O_2$ is much slower (rate constant $k < 8 \times 10^{-24}$ cm$^3$. molecule$^{-1}$. sec$^{-1}$ at 20° C.) than $NO + O_3 \rightarrow NO_2 + O_2$ ($k = 1.7 \times 10^{-14}$ cm$^3$ molecule$^{-1}$ sec$^{-1}$ at 20° C.) and is negligible. (See, J. G. Calvert, F. Su, J. W. Bottenheim, and O. P. Strausz. "Mechanism of the Homogeneous Oxidation of Sulfur Dioxide in the Troposphere." *Atmos. Environ.*, 12, 197, 1978 and H. S. Johnston, S. G. Chang, and G. Whitten, "Photolysis of Nitric Acid Vapor." *I. Phys. Chem.*, 78, 1, 1974 respectively.) The reaction of $O_3$ with $HSO_3^-/SO_3^{2-}$ in liquid phase is fast, but takes place only after the dissolution of $O_3$ in scrubbing liquors. The solubility of $O_3$ is small. The Henry's constant of $O_3$ is $1.23 \times 10^{-2}$ M.atm$^{-1}$ at 20° C. The concentration of gaseous $O_3$ produced is related to the vapor pressure of $P_4$, which is about 325 ppm at 50° C. (In reality, $P_4$ concentration is expected to be much smaller because of kinetic limitation. The residence time of spray in a column is short. The $P_4$ evaporation rate from the spray is the rate determining step.) One can calculate that the concentration of $O_3$ dissolved in the liquor is only $4.0 \times 10^{-5}$M when in equilibrium with 3250 ppm of $O_3$, the upper limit in a spray column. Therefore, the dissolved $O_3$ is only a small fraction (less than 1%) of the total $O_3$ at a typical L/G ratio (60–120).

Also, $O_3$ can be consumed by $P_4$ during its oxidation. The rate constants of reaction of $O_3$ with $P_4$ and its oxidation derivatives have not been reported. It is difficult to estimate the fraction of $O_3$ that would be consumed by phosphorus containing species. However, the reaction rate constants of $P_4$ with $O_2$ is comparable to that of $P_4$ with O. The concentration of $O_2$ is orders of magnitude larger than O. Most of the $P_4$ is expected to be oxidized by $O_2$. Based on the chemistry described, the presence of $SO_2$ in the flue gas is probably not going to affect the result significantly. The P/NO ratio can be improved by using good mixing conditions, where the $P_4$ spray is dispersed uniformly and the $O_3$ is accessible to the NO in the flue gas. Also, as stated previously, the temperature, $P_4$ concentration of the spraying liquor, NO and $O_2$ concentrations in the flue gas, and L/G will influence the P/NO ratio. Furthermore, $O_3$ and O may be consumed on the surface of the wall. A large-diameter spray column will reduce this wall effect and improve the effectiveness of $P_4$ utilization.

The fate of $P_4$, NO, and $SO_2$ in the system has been studied. The reaction of $P_4$ with $O_2$ generated phosphoric acid as white smoke. The concentration of white smoke in flue gas appeared to decrease slightly as the flue gas passed through the absorber but the amount absorbed was not a substantial portion (i.e. greater than 25%). The analysis of the scrubbing liquor by ion chromatography showed that the liquor contained phosphorus-containing species adding up to only 8–12%, and 15–25% of the $P_4$ consumed with a spray tower and with a CT-121 type absorber, respectively. The unabsorbed white smoke could be removed from the flue gas by treating it downstream from the absorber with concentrated preferably 40%–75%, phosphoric acid. The oxidation products of $P_4$ consisted of phosphoric acid ($H_3PO_4$), phosphorous acid ($H_3PO_3$), and hypophosphorous acid ($H_3PO_2$), with their molar ratio roughly in 10, 2, and 0.2, respectively, at the experimental conditions employed.

The analysis of scrubbing liquors revealed the presence of nitrogen-sulfur compounds, in addition to $NO_3^-$, $HSO_3^-$, $SO_4^{2-}$, $H_2PO_4^-$, $H_2PO_3^-$, and $H_2PO_2^-$. Only 5 to 15% of the NO removed was converted to $NO_3^-$. The majority of NO absorbed was found to be converted to nitrogen-sulfur compounds. The nitrogen-sulfur compounds are intermediates produced from the reaction of $NO_2^-$ with $HSO_3^-$. Many concurrent and consecutive reactions can take place and result in the production of intermediates, including hydroxyimidodisulfate [$HON(SO_3^-)_2$], hydroxysulfamate [$HONHSO_3^-$], hydroxylamine [$NH_2OH$], nitridotrisulfate [$N(SO_3^-)_3$], imidodisulfate [$HN(SO_3^-)_2$], and sulfamate [$NH_2SO_3^-$]. These nitrogen-sulfur intermediates have different reactivities and exhibit different half-lifes in the scrubbing system. The steady state concentrations of these intermediates vary depending on the scrubbing conditions. Hydroxyimidodisulfate and imidodisulfate are two intermediates most often found in high concentrations under the experimental conditions employed. When there is an excess of $HSO_3^-$ present in the liquor, such as conditions encountered using flue gas from a high-sulfur coal, these nitrogen-sulfur compounds are converted eventually to sulfamate ion, which then hydrolyzes to produce $NH_4^+$ ion in an acidic medium.

$$NO_2^- + 2HSO_3^- \rightarrow HON(SO_3)_2^{2-} + OH^- \tag{5}$$

$$HON(SO_3)_2^{2-} + HSO_3^- \rightarrow N(SO_3)_3^{3-} + H_2O \quad (6)$$

$$N(SO_3)_3^{3-} + H_2O \rightarrow HN(SO_3)_2^{2-} + SO_4^{2-} \quad (7)$$

$$HN(SO_3)_2^{2-} + H_2O \rightarrow H_2NSO_3^- + SO_4^{2-} + H^+ \quad (8)$$

$$H_2NSO_3^+ + H^+ \rightarrow H_2NSO_3H \quad (9)$$

$$H_2NSO_3H + H_2O \rightarrow NH_4^+ + SO_4^+ + H^+ \quad (10)$$

The overall reaction is $$NO_2^- + 3HSO_3^- + H_2O \rightarrow NH_4^+ + 3SO_4^{2-} - H^+ \quad (11)$$

A fraction of the absorbed $SO_2$ is converted to nitrogen-sulfur intermediates as described above. These intermediates will eventually decompose to form $SO_4^{2-}$ as the final product of absorbed $SO_2$.

For a flue gas the initial concentration of $NO_x$ (where x is 1 to 2) is between about 150 to 3000 parts per million (ppm) and optionally $SO_2$ is present in from between about 100 to 5,000 ppm. The $SO_2$ can be used to generate the bisulfite/sulfite needed in this process.

Gaseous ozone as an oxidizing agent is generated from sources for example as described by S-G. Chang et al. (1990), *Nature*, Vol. 343, p. 151; G. C. Lee et al. (1990), LBL Report at the 1990 $SO_2$ Control Symposium sponsored by EPA/EPRI, May 9-11, 1990, New Orleans, La.; and D. K. Liu et al. (1991), *Environ. Sci. and Technol.*, Vol. 25, p. 55, or by contact of yellow phosphorus with oxygen to produce gaseous ozone as described in U.S. Ser. No. 819,758, or U.S. Ser. No. 518,722. The yellow phosphorus is present with the $NO_x$ in a molar ratio of between about 10:1 to 1:10, preferably between about 2:1 to 1:2.

Gaseous $ClO_2$ is also used as an oxidizing agent in the present invention as described by any of the patents described hereinabove. The $ClO_2$ is present with the $NO_x$ in a molar ratio of $ClO_2/NO_x$ between about 10/1 and 1/10, preferably 2/1 to ½.

REMOVAL OF ACID FORMING GASES

Regardless of which oxidant, e.g., $ClO_2$, $O_3$ or $P_4/O_2$ is utilized for NO oxidation, the subsequent step is the dissolution of $NO_2$ in an alkaline solution. The dissolution of $NO_2$ can proceed through direct hydrolysis (Reaction 12), or by reaction with a reactive species in solutions such as $HSO_3^-/SO_3^{2-}$ (Reaction 13).

$$2NO_2 + H_2O \rightleftharpoons NO_2^- + NO_3^- + 2H^+ \quad (12)$$

$$NO_2 + HSO_3^-/SO_3^{2-} \rightarrow NO_2^- + HSO_3/SO_3^{1-} \quad (13)$$

The rate of Reaction (12) is slow. Nevertheless, the rate of dissolution of $NO_2$ can be increased by involving the Reaction (13). The more concentrated the bisulfite/sulfite ions are in solution, the larger the $NO_2$ dissolution rate becomes until the mass transfer becomes rate controlling. Consequently, more of the $NO_2$ behaves as an electrophilic reagent in the reactions. Although the addition of these reducing agents increase the $NO_2$ dissolution rate, subsequent oxidation of these additives may result in their destruction and produce a mixture of undesirable species. It is expected that $HSO_3^-/SO_3^{2-}$ are the most practical reagents. In the presence of $O_2$ or $HSO_3^-$, radicals produced in Reaction (13) are oxidized to $SO_4^{2-}$, which can readily separated from the scrubbing liquors by precipitation as gypsum. The gypsum can be used commercially.

Treatment of Nitrogen-Sulfur Compounds

Many concurrent and consecutive reactions can take place, resulting from the interaction between $NO_2-$ and $HSO_3-$, to produce many nitrogen-sulfur compounds, including: $HON(SO_3)_2^{2-}$ (hydroxylamine disulfonate, HADS), $HONH(SO_3)-$(hydroxylamine monosulfonate, HAMS), $N(SO_3)_3^{3-}$ (aminetrisulfonate, ATS), $HN(SO_3)_2^{2-}$ (aminedisulfonate, ADS), and $H_2NSO_3H$ (sulfamic acid, SA).

$$NO_2- + 2HSO_3- \rightarrow HON(SO_3)_2^{2-} + OH- \quad (5)$$

$$HON(SO_3)_2^{2-} + H_2O \rightarrow HONH(SO_3)_2- + SO_4^{2-} + H^+ \quad (14)$$

$$HON(SO_3)_2^{2-} + HSO_3- \rightarrow N(SO_3)_3^{3-} + H_2O \quad (6)$$

$$N(SO_3)_3^{3-} + H_2O \rightarrow HN(SO_3)_2^{2-} + SO_4^{2-} + H^+ \quad (15)$$

$$HN(SO_3)_2^{2-} + H_2O \rightarrow H_2NSO_3H + SO_4^{2-} \quad (16)$$

The formation of these nitrogen-sulfur compound were not realized by some investigators as demonstrated in their publications. For example, M. Kobayashi in *Nenryo Oyobi Nensho*, Vol. 42 (#3), p. 229-34, 1975, and S. Takahaski in *Netsu Kanri To Kogai*, Vol. 29 (#2), 37-43, 1977 suggest the following three main reactions to account for a Moretana process using $O_3$ or $ClO_2$ to oxidize NO to $NO_2$ followed by scrubbing the $NO_2$ with alkaline solution of $SO_2$:

$$2NO + ClO_2 + H_2O \rightarrow NO_2 + HNO_3 + HCl \quad (17)$$

$$SO_2 + 2NaOH \rightarrow Na_2SO_3 + H_2O \quad (18)$$

$$NO_2 + 2Na_2SO_3 \rightarrow \tfrac{1}{2}N_2 + 2Na_2SO_4 \quad (19)$$

In the study of the chemistry of $NO_2$ and $SO_2$ in a wet absorber, several nitrogen-sulfur compounds are found in a scrubbing liquor by means of two analytical techniques, Raman spectroscopy and ion chromatography. These nitrogen-sulfur compounds are very soluble, which makes their ultimate disposal difficult. Methods for separation of these compounds from the scrubbing liquors include the precipitation as potassium salts (Asahi Chemical's process), and the hydrolysis under acid-catalyzed conditions to form ammonium bisulfate (MHI, Mitsubishi Heavy Industries process). Both of the chemical methods are cumbersome and expensive. The high cost required for the disposal of these nitrogen-sulfur compounds increases the overall economic of this redox approach and presently retards its commercialization prospect for flue gas cleaning.

A simple method is described to solve this problem. The formation of nitrogen-sulfur compounds is initiated from the reaction of nitrous acid with bisulfite ions (Reaction 5). Chemical reagents, such as urea ($H_2NCONH_2$) and/or sulfamic acid ($NH_2SO_3H$), are added to scrubbing liquors to react with nitrous acid and to suppress the reaction between nitrous acid and bisulfite ions, to produce nitrogen as shown in Reactions (20) and (21) below:

$$H_2NCONH_2 + 2HNO_2 \rightarrow N_2 + CO_2 + 3H_2O \quad (20)$$

$$NH_2SO_3H + HNO_2 \rightarrow N_2 + HSO_4- + H_2O + H^+ \quad (21)$$

As a result of Reactions 20 and 21, nitrogen atoms in nitrous acid, urea, and sulfamic acid are converted to $N_2$, which is acceptable environmentally. Chemicals such as hydrazinium ion, hydrazoic acid, nitroaniline, sulphanilamide, sulphanilic acid, mercaptopropanoic acid, mercaptosuccinic acid, and/or cysteine also react with nitrous acid ($HNO_2$). However, the resulting products require further (usually expensive) treatment to comply with present environmental regulations.

REMOVAL OF NO

The effect of sulfamic acid additive on the suppression of HADS formation is demonstrated. A simulated flue gas containing between about 3000 to 150 ppm, preferably about 1000 ppm $NO_2$ is bubbled through an aqueous bisulfite solution (0.1M), whose acidity is controlled at pH 4 by an acetate buffer. A separate experiment is performed under identical conditions except that the sulfamic acid (1M) is added to the bisulfite solution. Raman spectra of the solutions are taken periodically during the course of bubbling. FIGS. 14 and 15 show the time dependent production of HADS and sulfate ion. The results reveal that the absorbing solution containing sulfamic acid produced much less HADS than that without sulfamic acid; this is attributed to the fact that a large fraction of dissolved $NO_2$ reacted with sulfamic acid to produce $N_2$. The suppression of HADS formation by sulfamic acid is found to be much more effective with increasing acidity of the scrubbing liquors. In scrubbing liquors containing 0.1M bisulfite ion, 1M sulfamic acid, and at pH 4, the rate of formation of HADS is about 68% of that without sulfamic acid; this rate decreases to 18% at pH 3 under identical conditions. Also, the fraction of absorbed $NO_2$ converted to HADS is reduced by increasing the relative concentration of sulfamic acid to bisulfite ion. At 0.01M bisulfite ion and pH 3, the rate of formation of HADS in the presence of 1M sulfamic acid is only 2% of that without sulfamic acid. Nitrous acid also reacts with urea to form $N_2$ (Reaction 20), but the reaction rate is more than two orders of magnitude smaller than with sulfamic acid under the same conditions.

A formulation consisting of an aqueous mixture of bisulfite, sulfamic acid, and an alkaline chemical (for the purpose of pH control) as a scrubbing liquor has been discovered to provide several advantages: (1) increasing the removal efficiency of $NO_2$, (2) converting NO to $NO_2$, which can be subsequently reduced to $N_2$, and (3) minimizing the formation of, and thus the treatment required for $NO_3-$ and various nitrogen-sulfur compounds. This scrubbing liquor formulation can be used to improve performance and economics of several wet processes (such as PhoSNOX), MHI, and Moretana) for combined removal of $NO_x$ and $SO_2$. Also, this formulation may be used in conjunction with several wet flue gas desulfurization processes, such as Union Carbide's Cansolv and Dow's amine processes, to achieve the simultaneous removal of $NO_x$. The process features are outlined below in Example 9.

The invention is illustrated further by the following examples which are not to be construed as limiting the scope of the invention.

EXAMPLE 1

The removal of NO from flue gas by yellow phosphorus in water was studied using a bench scale scrubber. The scrubber was an upright cylindrical Purex column (50 mm i.d. ×210 mm) with a fritted disc bottom capable of holding aqueous liquid. The scrubber was equipped with a thermometer for measuring the temperature of liquid therein and a pH electrode for measuring the pH of the liquid therein. A water jacket was provided to heat or cool the contents of the scrubber, and appropriate feed lines to admit measured amounts of gases for the simulated flue gas are provided. With this set-up accurate amounts of NO, $N_2$, $O_2$ and $SO_2$ are provided to the scrubber. The downstream side of the scrubber is equipped with appropriate condensers, an absorber, cold trap and analyzers for $NO_x$ and $SO_2$. 1.0 gram of yellow phosphorus (m.p.=44.1° C.) was melted in 0.2 liters of water at 60° C. in the scrubber. The pH of the aqueous phase was between 3 and 4. Yellow phosphorus globules were dispersed in water upon the bubbling of a gaseous mixture containing about 500 ppm NO, from 0 to 20% $O_2$, and the balance $N_2$ through the bottom of the column at a flow rate of 0.8–1.0 liter per minute. In addition to these runs wherein the amount of $O_2$ was varied, other runs were made wherein the amount of phosphorus was varied, the temperature of the aqueous emulsion was varied, and in which the pH of the aqueous emulsion was varied.

The gas mixture leaving the reaction column was passed through a condenser (length=390 mm), a gas washing bottle containing 0.2 liters of a 0.2M NaOH solution, a second condenser (length=200 mm), and then a cold trap (84° C.). The NO and $NO_2$ concentrations in the outlet gas was measured by a Thermoelectron Model 14A chemiluminescent $NO_x$ analyzer. The reaction was stopped after 2 hours. The pH of the scrubbing liquor and the NaOH absorber solution after the experiments were generally about 1.5 and 12.5, respectively. The NO and phosphorus derived products in, the spent solution in the scrubber as well as the NaOH absorber were determined by ion chromatography.

The passage of the simulated flue gas mixture through the scrubbing column containing the molten phosphorus creates a fine yellow phosphorus dispersion in water. When $O_2$ is present in the flue gas, a dense white phosphoric acid fume is produced which could lead to a significant response from the chemiluminescent $NO_x$ analyzer if left unchecked. This is believed to result from the chemiluminescence produced by incomplete oxidation of phosphorus. This interference decreased substantially when the partial pressure of $O_2$ in the flue gas is increased, consistent with the complete oxidation of phosphorus under those conditions.

The use of a NaOH absorber and a cold trap coupled with the monitoring of the scrubbed flue gas using the $NO_x$ mode on the chemiluminescent analyzer (which involves passage of the gas mixture through a stainless steel column at 650° C. half of the time) eliminates the white fumes.

The reaction was carried out using various amounts of phosphorus in the emulsion (at pH 3), and with an $O_2$ concentration of 4% in the simulated flue gas. The results of these runs are shown graphically in FIG. 1. It is clear that the initial NO removal efficiencies were higher at higher concentrations of phosphorus and reaches about 90% at 2.0% by weight yellow phosphorus.

The effect of the temperature of the emulsion was determined in a number of experiments, and the results are shown in FIG. 2. In these runs, the emulsion contained 0.5% yellow phosphorus at pH 3 and the flue gas contained 550 ppm NO, 4.0% $O_2$, and the remainder $N_2$. Whereas the initial NO removal efficiencies were higher at higher temperatures, the overall effectiveness for NO removal were lowered under these conditions. For instance, the initial removal percentage of NO was increased from 78% to 99% when the temperature of the emulsion was raised from 50° C. to 75° C.

The influence of pH on the effectiveness for NO removal of a yellow phosphorus emulsion has been determined, and the results of the experiments are shown in FIG. 3. In these runs, the $O_2$ content was adjusted to 4% by volume. As shown in FIG. 3, the effectiveness for NO removal increases with increasing acidity of the aqueous phase over the pH range of 3.0 to 9.0.

The influence of $O_2$ concentration in the flue gas was also determined, and the data is shown in FIG. 4. As there shown, the presence of $O_2$ is essential for the removal of NO by yellow phosphorus emulsions. In addition, the effectiveness for NO removal of a phosphorus emulsion increases as the $O_2$ content of the simulated flue gas mixture increases. In these runs, the NO absorption reaction was carried out at pH 3 and 60° C. using a 0.5% by weight yellow phosphorus emulsion. The use of yellow phosphorus for the removal of flue gas works best under forced oxidation conditions.

EXAMPLE 2

Comparison Example

A comparison of the NO removal effectiveness of yellow phosphorus and red phosphorus was made for use in treating simulated flue gases having 500 ppm NO using the apparatus of Example 1. Both emulsions of 0.5% by weight yellow phosphorus and suspensions of 1.5% by weight red phosphorus were used to treat a simulated flue gas of 500 ppm NO and 4% $O_2$ at 60° C. The yellow phosphorus emulsion removed up to 80% of the NO whereas none of the red phosphorus emulsions removed any detectable amount. At pH 9, the yellow phosphorus emulsion removed up to 40% of the NO whereas the red phosphorus still did not remove a detectable amount. At pH 10.1, the red phosphorus did remove some NO but the effectiveness was still very low (P/NO about 1,000).

EXAMPLE 3

Spray drying experiments were carried out using a Niro Atomizer portable spray dryer equipped with a Type M-02/a centrifugal atomizer. The volume of the spray drying chamber was about 350 liters, and the gas flow capacity was about 500 liters per minute. Yellow phosphorus was introduced to the spray dryer chamber either in liquid form (as an emulsion in water) or in solid particulate form (as a fine particulate dispersion in water prepared by the rapid cooling of a phosphorus in water emulsion from about 80° C. to room temperature). The inlet temperature of the simulated flue gas mixture (containing 490 ppm NO, 20% $O_2$, and the balance $N_2$) was 170° C. and the exit gas temperature was 65° C. Using a 0.25% by weight yellow phosphorus emulsion up to 40% of the NO was removed. In a separate experiment, fine particulate dispersions of yellow phosphorus (5% by weight) also containing 3.2M urea were used in the spray drying system. The simulated flue gas contained about 550 ppm NO, and up to about 70% of the NO was removed. It is expected that higher removals may be achieved using a more concentrated phosphorus emulsion and/or under better operating conditions.

EXAMPLE 4

In this example, various levels of NO in the simulated flue gas were treated using the apparatus of Example 1. The 150 cc aqueous emulsion contained 1.0 gram of $CaCO_3$ in all cases except Example 4f, where a pH 4.3 acetate buffer was used. The simulated flue gas contained 11–12% $O_2$, and the total gas flow rates were 0.8–1.0 liter per minute. Total experimental time ranged between 2 and 3 hours. Other operating conditions used, and the results obtained, are given in the Table below.

TABLE

| Example | NO (ppm) | Temp. (OC) | Initial pH | Phosphorus added (gm) | Maximum % Removal | Average % Removal |
| --- | --- | --- | --- | --- | --- | --- |
| 4a | 60 | 50 | 6.5 | 1.5 | 100 | 100 |
| 4b | 65 | 50 | 6.3 | 0.8 | 100 | 100 |
| 4c | 400 | 50 | 6.2 | 0.8 | 80 | 43 |
| 4d | 430 | 50 | 7.4 | 1.5 | 100 | 76 |
| 4e | 1950 | 50 | 6.2 | 3.1 | 55 | 29 |
| 4f | 2000 | 75 | 4.3 | 4.0 | 95 | 72 |

From these examples, it is seen that very efficient removal is achieved at 50° C. when low concentrations of NO are to be removed. In the examples given, satisfactory removal of higher concentrations of NO were achieved at 75° C.

EXAMPLE 5

The simultaneous removal of NO and $SO_2$ from a simulated flue gas was carried out using a yellow phosphorus emulsion mixed with a slurry of limestone. The apparatus used in this experiment is similar to that of Example 1, except that the reactor had a volume of about 1.2 liter (110 mm id.×130 mm). 0.9 liters of an aqueous emulsion/slurry containing 3.3% by weight of yellow phosphorus and 5.0% by weight of $CaCO_3$ was dispersed by a magnetic stir bar. The temperature of the scrubbing liquor was kept at 55° C. and the pH was 7.5. The absorber was provided with a 5.0% by weight slurry of $CaCO_3$. A simulated flue gas mixture containing 560 ppm NO, 2900 ppm $SO_2$, 10% $O_2$, and the balance $N_2$ was bubbled into the slurry at a rate of about 1.3 liters per minute. The reaction temperature was maintained at 55° C., whereas the pH of the slurry dropped from about 7.5 to about 4.2 after 3 hours. The removal rates of NO and $SO_2$ are shown in FIG. 5 wherein it is seen that the removal of $SO_2$ quickly reaches about 100% and shortly thereafter the removal rate of NO reaches about 100%. From these data, it appears that NO removal by the use of yellow phosphorus is enhanced when $SO_2$ and limestone are present.

The solid and liquid phases in the scrubber and in the absorber were separated by suction filtration and analyzed. The solid collected from the scrubber after the reaction was analyzed by laser Raman spectroscopy; and was shown to contain $CaSO_4.2H_2O$, in addition to unreacted $CaCO_3$ and yellow phosphorus. In the absorber downstream, only unreacted $CaCO_3$ was detected. No $CaSO_3.\frac{1}{2}H_2O$ precipitate was detected in either the scrubber or the absorber.

It was found that both the scrubbing liquor and the absorbing solution contain $NO_2^-$, $NO_3^-$, $SO_3^=$, $SO_4^=$, $H_2PO_2^-$, $HPO_3^=$, and $HPO_4^=$. Since the amount of $NO_2^-$ and $NO_3^-$ recovered could account for only about 50% of the NO absorbed and a substantial amount of $HSO_3$ was present in the scrubbing liquor, a search for nitrogen-sulfur compounds was conducted. Indeed, we found that about 40% of the NO absorbed could be accounted for by the formation of the nitrogen-sulfur compounds hydroxylamine disulfonate (HADS) and amine disulfonate (ADS) in a slightly acidic (pH about 4) scrubbing liquor. We also found that both HADS and ADS were subsequently hydrolyzed to $NH_4^+$ in the scrubbing liquor when the pH was lowered to about 2. The formation of nitrogen-sulfur compounds via the reaction of $NO_2^-$ and $HSO_3^-$ in scrubbing liquor and their hydrolysis reactions have been well studied, and the $NH_4^+$ formation follows from these studies. Therefore the use of yellow phosphorus emulsions for combined $NO_x$ and $SO_2$ removal results in the conversion of undesirable NO to $NH_4^+$, $NO_3^-$, and $NO_2^-$, all of which are desirable chemicals for the manufacture of fertilizer.

EXAMPLE 6

A simulated flue gas mixture with about 5% oxygen was prepared by passing liquid nitrogen from a standard pressurized 160 liter dewar through a vaporizer column (Hex Industries) and by mixing the gas with compressed air to obtain the desired oxygen concentration. NO and $SO_2$ were blended in to give concentrations of 275-350 ppm and 1500-3000 ppm, respectively. $CO_2$ could be added up to approximately 10% of the total gas flow. The gas stream flowed, at a rate of 20 acfm, through an electric air heater where it was heated to a temperature of 350° F. The heated gas then entered the absorber. Two types of absorbers were tested: a spray tower type and a bubbling type absorber. The spray tower absorber was a 4 in diameter by 4 ft long glass column installed with spray nozzles (Spraying Systems, Inc.). Two different spray nozzle set-ups were tested: a two nozzles (2.0 gal/min per nozzle) set-up, in which nozzles were divided into two parallel rows with each row containing 5 nozzles in series. An aqueous mixture of $P_4$ and limestone slurry was sprayed in the absorber. A countercurrent flow of flue gas entered at the base of the absorber arid passed upward through the falling spray of slurry as shown in FIG. 6.

The bubbling absorber was a scaled-down simulation of the Bechtel CT-121 system. As shown in FIG. 7, the bubbling absorber system included a prescrubber and a scrubber. The spray tower column just described was used as a prescrubber. The scrubber column was constructed of a 4 in diameter by 4 ft section stainless steel pipe. Four ⅜ in diameter stainless steel tubes served as impingers directing the gas into the limestone slurry at the bottom of the column. An aqueous emulsion of $P_4$ was sprayed downward in a prescrubber which quenched and conditioned the flue gas flowing upward. The pretreated flue gas then entered a scrubbing column downward through impingers that submerged about 10 inches under the aqueous limestone slurry. A froth layer was formed when the gas entered the scrubber, which provided a greatly extended interfacial area for gas-liquid contact. Air (0.85 cfm) was fed into the bottom of the scrubber to force oxidize the $HSO_3^-$ to $SO_4^{2-}$. Probes in the column allowed measurements of pH and temperature.

The concentration of $P_4$ in the scrubbing liquors ranged from 0.5 to 0.8% w/w, while that of limestone was 6-10% w/w. A 2-liter Erlenmeyer flask was used as a holding tank for liquid mixture from the spray column. A liquid mixture was recirculated with a centrifugal pump (Price Pump Co.) to the top of the spray column. The pH of the scrubbing liquor was controlled by feeding an aqueous mixture of limestone and lime from a thermostated reservoir (50° C.) to the hold tank by a Masterflex pump (Randolph-Austin Corp.). The pH range studied was 3.5 to 6. The hold tank temperature was controlled at 50°-55° C. $P_4$ could be continuously fed into the system from a burette containing liquid $P_4$ and water. $P_4$ (specific gravity 1.80) settled at the bottom of the burette. The burette was wrapped with a heating tape to maintain the temperature of $P_4$ in the burette above 44° C., its melting point.

The gas from the absorber was then directed through a washing column. In the washing column, concentrated phosphoric acid (40-60%) was sprayed through a 1 gal/min nozzle (Spraying Systems, Inc.) and recirculated by a centrifugal pump to absorb the phosphorus "white smoke". The phosphoric acid "white smoke" was produced by oxidation of the $P_4$ to phosphorus pentaoxides which picked up moisture to form phosphoric acid "white smoke" aerosols.

The $NO_x$ chemiluminescent analyzer and the $SO_2$ fluorescent analyzer have intake connections to the gas stream at various points along the system. The NO, $NO_x$ and $SO_2$ concentrations can thus be measured and the effectiveness of the absorber operation can be evaluated.

Liquids from the different columns in the system can be analyzed by ion chromatography and laser Raman spectroscopy to determine the identity and concentration of the anions present. The solid precipitates can be analyzed by FTIR and laser Raman spectroscopy.

At a flow rate of 20 acfm, the superficial velocity of flue gas in a 4 in diameter column was about 4 ft/sec, which is typical in a CT-121 scrubber. This is slower than that in spray tower systems, where the velocity is 8-12 ft/sec. However, the gas-liquid contact time and liquid gas (L/G) ratio are more significant physical parameters to simulate when scaling down. In the case of a spray tower scrubber, the contact time of gas and liquid sprays is about 2-5 sec and L/G ranges between 60 and 120 depending on the $SO_2$ concentrations and removal requirements. In the case of a CT-121 scrubber, the $SO_2$ removal efficiency is a function of the depth of submergence of the spargers. A submergence of 8 inches will generally provide 90% removal efficiency with a gas superficial velocity of 4 ft/sec. A 10-inch submergence was provided in the test equipment. The height of froth layer created in a 4 inch column is somewhat larger than that in a commercial reactor, however. The main objective of the small bench-scale test was to prove the concept of $NO_x$ removal simultaneously with $SO_2$ removal in wet limestone systems, and not to obtain data for scale-up to a commercial size.

The results of a typical run on the removal efficiency of NO and $SO_2$ is shown in FIG. 8. This was a run using a bubbling absorber. An aqueous emulsion of $P_4$ initially containing 0.8% w/w $P_4$ was sprayed and recirculated in the prescrubber. The initial limestone concentration in the bubbling scrubber was 6% w/w and the temperature of the limestone slurry was 55° C. The flue gas contained 300 ppm NO, 1500 ppm $SO_2$ and 4.5% $O_2$. The flow rate of flue gas was 15.60 acfm, corresponding to a superficial velocity ($V_f$) of 3.3 ft/sec in the column. The removal efficiency of NO could be maintained at more than 85% during most of the experiment until near the end of the run, when the concentration of $P_4$ was substantially depleted. Also, the initial removal efficiency of NO was not as good. This is attributed to the poor mixing of $P_4$ with water at the beginning of the experiment. The spray nozzles can break up $P_4$ globules and create a finely dispersed $P_4$ emulsion in water. The removal efficiency of $SO_2$ depends strongly on the pH of the scrubbing liquor. Initially, $SO_2$ was removed completely at a pH of 5.5. The efficiency dropped to about 90% when the pH of slurry decreased to 4.5.

The NO removal efficiency measures the effectiveness of $NO_x$ absorption in the scrubbing liquor, and depends on the extent of NO oxidation to $NO_2$, the mixing of flue gas with liquor, and sulfite/bisulfite ion concentration. The oxidation efficiency measures the effectiveness of the oxidation of NO to $NO_2$ by the $P_4$-induced oxidation method. As stated previously, the NO oxidation efficiency is related to the concentration of $P_4$ in the spray liquor, $O_2$ concentration in the flue gas, temperature, and the mixing of the spray with flue gas. The factors influencing the mixing include the L/G ratio, size and uniformity of the spray, and the contact time.

EXAMPLE 7

A set of experiments were conducted by varying the flow rate of flue gas at a constant flow rate of recycling liquor. As a result, the superficial velocity and contact time of the flue gas with the spray also varied. The apparatus and conditions, unless otherwise stated, were similar to those of Example 6. The resulting NO oxidation and removal efficiencies as a function of L/G and $P_4$ concentration are shown in FIGS. 10 and 11 for a spray tower and a bubbling scrubber, respectively. With a spray tower absorber, an aqueous emulsion of $P_4$ limestone was sprayed and recirculated in a single spray column. Therefore, the generation of $O_3$, the oxidation of NO to $NO_2$ and the absorption of $NO_2$ and $SO_2$ in scrubbing liquor took place in one column. The oxidation efficiency was more than 80% at a L/G of 60, while the removal efficiency was only 60%. The removal efficiency did not reach 80% until a L/G of 90. The increase of $P_4$ concentration from 0.5% to 0.8% improved slightly both the oxidation and removal efficiencies. The effect was more apparent at low L/G values. With a CT-121 type scrubber, the oxidation occurred in a prescrubber where an aqueous emulsion of $P_4$ was sprayed, and the absorption took place in a bubbling absorber containing a limestone slurry. The oxidation efficiencies were more than 90% and the removal efficiencies more than 80% at a L/G of 60 or more. These results are better than those with a spray tower scrubber at given experimental conditions. This is attributed mainly to the difference in spray quality between two types of scrubbers. The spray nozzles are susceptible to clogging when the recirculating liquor contains limestone and gypsum particles. The limestone in the spray may also surround the $P_4$ droplets and reduce the effective concentration of $P_4$.

Because the diameter of the spray column is 4 in, the droplets hit the wall in a short distance after being sprayed. The liquor then flows down along the wall of the column and exhibits poor contact with flue gas. Consequently, the mixing in the bench-scale system is not as effective as that in a commercial scale system at a given L/G. The consideration of the contact time of the droplets with flue gas may be more meaningful. FIG. 11 shows a plot of the NO oxidation and removal efficiencies as a function of contact time. The results were obtained with a spray tower scrubber. The gas-droplet contact distance was estimated to be 2 ft. The contact time can be varied by changing the flow rate of the flue gas. The NO oxidation achieved 100% efficiency, and the $NO_x$ removal reached 90% efficiency with a contact time of 1.4 secs, which is less than that (2-5 secs) in a commercial system.

EXAMPLE 8

The NO oxidation efficiency as a function of contact time in a prescrubber of a CT-121 simulation system was carried out. A plot of the results is shown in FIG. 12. The apparatus was similar to the one used in Example 7. The spraying liquor was composed of an aqueous emulsion of $P_4$ and did not contain limestone. The spray appeared to be more uniform and the nozzles did not show clogging problems. The contact distance was estimated to be 2.5 ft. The oxidation efficiency was slightly better than that in a spray tower system at the same contact time, but the improvement was less than the experimental uncertainty.

Based upon these experiments, a possible commercial conceptual process configuration with the following features is shown in FIG. 13.

injecting a phosphorous emulsion into an existing wet limestone scrubbing system adding a "Brink" separator/hydrator downstream of the scrubber to capture and convert the $P_2O_5$ to phosphoric acid byproduct installing necessary equipment to recover other byproducts (calcium phosphate and ammonium phosphate)

adding new fan capacity to compensate for the additional pressure drop

The actual P/NO requirement depends on the equipment (i.e. scrubber) used for contacting the gas and the phosphorus emulsion. In the bench-scale equipment used where the contacting time was short and the mixing was relatively inefficient, the required P/NO ratio was from 0.6 to 1.0. For more efficient contacting devices and longer contact time, as typically in most commercial scrubbers, a ratio around 0.5 can be reasonably expected.

EXAMPLE 9

Reduction of Gaseous Acid-Forming Compounds

The process features are outlined as follows:

Step 1—An oxidant is independently selected from $P_4/O_2$, $ClO_2$, or $O_3$ and used to oxidize NO in flue gas to $NO_2$, as described or adapted from U.S. Ser. No. 819,758.

Step 2—A mixture of bisulfite (0.001 to 0.5M) and sulfamic acid (0.1 to 5M) solution is used in an absorber (prescrubber and/or scrubber) to absorb $NO_2$ (Reaction 13 and 21). The acidity of the absorbing liquor is controlled at pH 1-5, preferably at pH 3-4, by an alkaline chemical such as limestone ($CaCO_3$), lime ($Ca(OH)_2$), $NaHCO_3$, $Na_2CO_3$, $NaHSO_3$, $Na_2SO_3$, or flyash. The temperature of the absorbing liquor is between about 20° and 80° C., preferably between about 45° and 65° C. The $SO_2$ in flue gas is also absorbed. The bisulfite ion in the absorbing liquor can be supplied from the absorption of $SO_2$ in flue gas and/or by the addition of bisulfite/sulfite salts. Sulfamic acid can be prepared from the reaction of nitrite ions with excess bisulfite ions, or from the reaction of urea with sulfuric acid. Also, sulfamic acid can be obtained from the commercial supplier. The absorbing liquor is recirculated. A bleed stream is taken out for the disposal of undesirable contaminants such as flyash, trace metals, and sulfate. This bleed stream may be recycled after filtration.

Steps 1 and 2 may be combined into a single step or reaction vessel; for example, $P_4$ may be added to the aqueous mixture of bisulfite and sulfamic acid.

Step 3—If necessary, flue gas is optionally further treated with an alkaline absorbing liquor in another absorber (scrubber) to ensure high efficiency removal of $SO_2$ and/or $NO_x$. Limestone of lime may be used as a alkaline material to control pH (3.5–6.5) of the absorbing liquor. The resulting calcium salts (sulfite and/or salfate) precipitate and are separated from the scrubbing liquors. The scrubbing liquor is recirculated. A bleed stream of this scrubbing liquor is fed to a prescrubber loop, where nitrite ion is reduced to $N_2$ by sulfamic acid. Also, a combination of a sodium salt ($NaHSO_3$, $Na_2SO_3$, $NaHCO_3$, or $Na_2CO_3$) with selective amines are used as an absorbing liquor. The suitable amines must be thermally stable at wet scrubber conditions (55° C.), have low vapor pressure, and have an appropriate pK (3.0–5.5) for the formation of reversible salts with bisulfite and nitrite ions, but not with carbonate ion. Some of these amines have been disclosed in patents, e.g. in Union Carbide's Cansolv and Dow Chemical Company's amine process for flue gas desulfurization. When an oxidant is used of oxidize NO to $NO_2$ in flue gas, some $NO_2$ as well as $SO_2$ may pass through the prescrubber in Step 2 and amine nitrite and amine sulfite in the scrubber. Both of these compounds are reversible salts and are decomposed to evolve $N_2O_3(NO+NO_2)$ and $SO_2$ by steam stripping to regenerate amines. NO, $NO_2$, $SO_2$ and $H_2O$ are separated from each other by liquification at their characteristic critical pressure. NO and $NO_2$ optionally are recycled back to a boiler for thermal decomposition, while $SO_2$ is optionally processed to form elemental sulfur or sulfuric acid. The amine stable salts such as sulfate, nitrate, chloride, and sulfonate are treated in an ion exchange column to regenerate the corresponding amine for recycling.

While only a few embodiments of the invention have been shown and described herein, it will become apparent to those skilled in the art that various modifications and changes can be made in the process using aqueous molten yellow phosphorus and air to produce ozone in situ (and/or phosphoric acid) to destroy or remove undesirable organic or inorganic chemicals, e.g. NO, followed by contact with urea or sulfamic acid to produce nitrogen without departing from the spirit and scope of the present invention. All such modifications and changes coming within the scope of the appended claims are intended to be carried out thereby.

I claim:

1. An improved process for reducing the concentration of NO in a gas, which process comprises:
    (A) contacting a gas containing NO and $SO_2$ with a gaseous oxidizing agent to oxidize the NO to $NO_2$; and
    (B) contacting the oxidized gas of step (A) comprising $NO_2$ with
    an aqueous reagent of bisulfite in admixture with sulfite formed by the reaction of $SO_2$ and water and a compound selected from urea, sulfamic acid, hydrazinium ion, hydrazoic acid, nitroaniline, sulfanilamide, sulfanilic acid, mercaptopropanoic acid, mercaptosuccinic acid, cysteine or combinations thereof to reduce the formation of any compounds comprising both nitrogen and sulfur at between about 0° and 100° C. at a pH of between about 1 and 7 for between about 0.01 and 60 sec to reduce the concentration of NO in the gas.

2. The process of claim 1 wherein a compound in step (B) is selected from urea, sulfamic acid, or combinations thereof.

3. The process of claim 1 wherein a compound in step (B) comprises sulfamic acid, and the reduction product of $HNO_2$ in step (B) comprises nitrogen.

4. The process of claim 1 wherein in step (A) the gaseous oxidizing agent is selected from $O_3$, $ClO_2$, the gaseous reaction product of $P_4$ and $O_2$, or combinations thereof.

5. The process of claim 4 wherein
in step (B) the compound is selected from urea, sulfamic acid or combinations thereof, and the temperature is between about 10° and 90° C.

6. The process of claim 4 wherein
in step (B) the compound is selected from hydrazinium ion, hydrazoic acid, nitroaniline, sulfanilamide, sulfanilic acid, mercaptopropanoic acid, mercaptosuccinic acid, cysteine or combinations thereof, and the temperature is between about 10° and 90° C.

7. The process of claim 1 wherein
in step (B), the compound is sulfamic acid, the temperature is between 10° and 90° C., the pH is adjusted to between about 2 and 5, and the time is between about 0.1 and 30 sec.

8. The process of claim 7 wherein
the temperature is between about 20° and 80° C.

9. The process of claim 7 wherein
the gaseous oxidizing agent is selected from ozone, $ClO_2$, or the gaseous oxidizing species produced by the reaction of $P_4$ and $O_2$.

10. The process of claim 1 wherein in step (B) the bisulfite is present in between about 0.001 and 0.5 Molar and the compound is sulfamic acid present in between about 0.1 and 5M.

11. An improved process for reducing the concentration of one or more nitrogen-oxygen-containing compounds in a gas, which process comprises:
    (a) contacting a gas containing NO and $SO_2$ with a gaseous oxidizing agent selected from $O_3$, $ClO_2$, the product of the reaction of $P_4$ and $O_2$, or combinations thereof to produce $NO_2$ in the gas phase,
    (b) contacting the oxidized gas of step (a) with an aqueous reagent which first converts $NO_2$ to $HNO_2$, said aqueous reagent comprising bisulfite in admixture with sulfite formed by the reaction of $SO_2$ and water, and a compound selected from urea, sulfamic acid or combinations thereof to reduce the formation of any compounds comprising both nitrogen and sulfur, at between about 5° and 95° C. at a pH of between about 1 and 7 for between about 0.01 and 60 sec in an amount sufficient to substantially convert the nitrogen atom present in the $HNO_2$ to nitrogen; and
    (c) producing a gas having a reduced concentration of NO.

12. The process of claim 11 wherein
the compound is sulfamic acid.

13. The process of claim 12 wherein $SO_2$ is present and the pH is adjusted to between 1 and 7 by the addition of $CaCO_3$, $Ca(OH)_2$, $NaHCO_3$, $NA_2CO_3$, $Na_2SO_3$, flyash, or combinations thereof.

14. The process of claim 11 wherein the pH is adjusted to between about 3 and 4.

15. The process of claim 11 wherein the temperature of the reaction in steps (a) and (b) is between about 20° to 80° C.

16. The process of claim 11 wherein steps (a) and (b) are performed in a simultaneous manner.

17. The process of claim 11 wherein step (b), bisulfite is present in between about 0.001 and 0.5M, sulfamic acid is present in between about 0.1 and 5M, the temperature is between about 20° and 80° C., and the pH is adjusted to between about 1 and 5 using $CaCO_3$, $Ca(OH)_2$, $NaHCO_3$, $NaHCO_3$, $Na_2CO_3$, $Na_2SO_3$, flyash, or combinations thereof.

18. The process of claim 11 wherein the gas of step (a) is an exhaust gas comprising initially from between about 15 to 3000 parts per million of $NO_x$ where x is 1 to 2.

19. The process of claim 18 wherein $SO_2$ is also present in step (a) in form between about 100 and 5,000 ppm.

20. An improved process for reducing the concentration of NO in a gas, which process comprises:
 (A) contacting a gas containing NO and $SO_2$ with a gaseous oxidizing agent to oxidize the NO to $NO_2$;
 (B) contacting the oxidized gas of step (A) comprising $NO_2$ with an aqueous reagent of bisulfite in admixture with sulfite formed from the reaction of $SO_2$ and water, and
 a compound selected for urea, sulfamic acid, hydrazinium ion, hydrazoic acid, nitroaniline, sulfanilamide, sulfanilic acid, mercaptopropanoic acid, mercaptosuccinic acid, cysteine or combinations thereof to reduce the formation of any compounds comprising both nitrogen and sulfur, at between about 0° and 100° C. at a pH of between about 1 and 7 for between about 0.01 and 60 sec;
 (B') producing a gas having a reduced concentration of $NO_2$; and
 (C) contacting the reaction product of step (B) with means to reduce the concentrations of the organic products of the reaction of step (B).

21. The process of claim 20 wherein the compound is selected from urea, sulfamic acid, or combinations thereof.

22. The process of claim 20 wherein the reagent comprises sulfamic acid, and the reaction product of step (B) comprises nitrogen.

23. The process of claim 20 wherein in step (A) the gaseous oxidizing agent is selected from $O_3$, $ClO_2$, the product of the reaction of $P_4$ and $O_2$, or combinations thereof.

24. The process of claim 23 wherein in step (B) the compound is selected from urea, sulfamic acid or combinations thereof.

25. The process of claim 23 wherein
 in step (B) the compound is selected from hydrazinium ion, hydrazoic acid, nitroaniline, sulfanilamide, sulfanilic acid, mercaptopropanoic acid, mercaptosuccinic acid, cysteine or combinations thereof.

26. The process of claim 20 wherein
 in step (B), the compound is sulfamic acid, the temperature is between 10° and 90° C. the pH is adjusted to between about 2 and 5, and the time is between about 0.1 and 30 sec.

27. The process of claim 26 wherein
 the temperature is between about 20° and 80° C.

28. The process of claim 26 wherein
 the gaseous oxidizing agent is selected from ozone, $ClO_2$, or the gaseous oxidizing species produced by the reaction of $P_4$ and $O_2$.

29. The process of claim 20 wherein in step (B) the bisulfite is present in between about 0.001 and 0.5 Molar and the compound is sulfamic acid present in between about 0.1 and 5M.

* * * * *